United States Patent
Joshi et al.

(10) Patent No.: US 11,323,747 B2
(45) Date of Patent: May 3, 2022

(54) RESIDUAL DIFFERENTIAL PULSE CODE MODULATION (DPCM) EXTENSIONS AND HARMONIZATION WITH TRANSFORM SKIP, ROTATION, AND SCANS

(71) Applicant: QUALCOMM Incorporated, San Diego, CA (US)

(72) Inventors: Rajan Laxman Joshi, San Diego, CA (US); Joel Sole Rojals, La Jolla, CA (US); Marta Karczewicz, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 1182 days.

(21) Appl. No.: 14/295,540

(22) Filed: Jun. 4, 2014

(65) Prior Publication Data
US 2014/0362917 A1 Dec. 11, 2014

Related U.S. Application Data

(60) Provisional application No. 61/831,581, filed on Jun. 5, 2013.

(51) Int. Cl.
*H04N 19/91* (2014.01)
*H04N 19/44* (2014.01)
(Continued)

(52) U.S. Cl.
CPC ........... *H04N 19/91* (2014.11); *H04N 19/129* (2014.11); *H04N 19/44* (2014.11); *H04N 19/46* (2014.11); *H04N 19/51* (2014.11); *H04N 19/593* (2014.11)

(58) Field of Classification Search
CPC ...... H04N 19/46; H04N 19/129; H04N 19/44; H04N 19/51; H04N 19/91; H04N 19/593;
(Continued)

(56) References Cited

U.S. PATENT DOCUMENTS 5,276,525 A * 1/1994 Gharavi ................ H04N 19/63
348/398.1
5,565,920 A * 10/1996 Lee ....................... H04N 19/503
348/699

(Continued)

FOREIGN PATENT DOCUMENTS

CN 101573985 A 11/2009
CN 102857764 A 1/2013
(Continued)

OTHER PUBLICATIONS

Lee et al. ("AHG7: Residual DPCM for HEVC Lossless Coding") JCTVC-L0117, Jan. 14, 2013.*
(Continued)

*Primary Examiner* — Mohammed Jebari
(74) *Attorney, Agent, or Firm* — Shumaker & Sieffert, P.A.

(57) ABSTRACT

Techniques are described for harmonizing coding techniques when residual differential pulse code modulation (RDPCM) is applied to a residual block. In some examples, a scan order used for such a residual block may be required to be the same as when the residual block is generated from intra-predicting the current block and when the residual block is generated from inter-predicting or intra block copy predicting the current block.

26 Claims, 6 Drawing Sheets

(51) Int. Cl.
  *H04N 19/51*    (2014.01)
  *H04N 19/593*   (2014.01)
  *H04N 19/129*   (2014.01)
  *H04N 19/46*    (2014.01)

(58) Field of Classification Search
  CPC ....... H04N 19/00533; H04N 19/00763; H04N 19/00951; H04N 19/00587; H04N 7/50; H04N 7/26244; H04N 7/26031; H04N 7/26271; H04N 7/26015
  See application file for complete search history.

(56) References Cited

U.S. PATENT DOCUMENTS

| | | | |
|---|---|---|---|
| 5,657,085 A * | 8/1997 | Katto | H04N 19/647 348/398.1 |
| 6,055,017 A * | 4/2000 | Shen | H04N 19/63 348/437.1 |
| 9,420,293 B2 | 8/2016 | Song et al. | |
| 2004/0008781 A1* | 1/2004 | Porter | H04N 19/176 375/240.16 |
| 2007/0065026 A1 | 3/2007 | Lee et al. | |
| 2009/0067734 A1* | 3/2009 | Kalevo | G06T 9/004 382/238 |
| 2013/0114716 A1* | 5/2013 | Gao | H04N 19/593 375/240.14 |
| 2014/0016698 A1 | 1/2014 | Joshi et al. | |
| 2014/0226721 A1 | 8/2014 | Joshi et al. | |
| 2014/0286400 A1 | 9/2014 | Joshi et al. | |
| 2014/0286413 A1 | 9/2014 | Joshi et al. | |
| 2014/0301449 A1* | 10/2014 | Oh | H04N 19/176 375/240.03 |

FOREIGN PATENT DOCUMENTS

| | | |
|---|---|---|
| CN | 102907100 A | 1/2013 |
| EP | 1773071 A2 | 4/2007 |
| JP | 2011199685 A | 10/2011 |

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting Geneva, CH, Mar. 16-23, 2011, 193 pp.

Bross et al., "WD4: Working Draft 4 of High-Efficiency Video Coding," 6th Meeting: JCTVC-F803_d2, Torino, IT, Oct. 4, 2011, 226 pp.

Bross et al., "WD5: Working Draft 5 of High-Efficiency Video Coding," 7th Meeting: Geneva, Switzerland, Dec. 30, 2011, JCTVC-G1103_d2, 214 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 9, 2012, JCTVC-J1003_d7, 261 pp.

Bross et al., "High efficiency video coding (HEVC) text specification draft 9," 11th Meeting: Shanghai, CN, Nov. 2, 2012, JCTVC-K1003_V7, 290 pp.

Bross et al., "High efficiency video coding (HEVC) text specification draft 10 (For FDIS & Last Call)," 12th Meeting Geneva, CH, Mar. 19, 2013, JCTVC-L1003_V34, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Budagavi et al., "AHG8: Video coding using Intra motion compensation", JCT-VC Meeting; MPEG Meeting; Apr. 18-26, 2013; Incheon; (Joint Collaborative Team On Video Coding of ISO/IEC JTC1/SC29/WG11 and ITU-T SG.16); URL: HTTP://WFTP3.ITU.INT/AV-ARCH/JCTVC-SITE/, No. JCTVC-M0350, XP030114307, 3 pp.

Cohen et al., "Modified coefficient scan order mapping for transform skip mode", JCT-VC Meeting; MPEG Meeting; Jul. 11-20, 2012; Stockholm; (Joint Collaborative Team on Video Coding of ISO/IEC JTC1/SC29/WG11 and ITU-T SG.16); URL:HTTP://WFTP3.ITU.INT/AV-ARCH/JCTVC-SITE/, No. JCTVC-J0313, XP030112675, 8 pp.

Lee et al., "RCE2: Test 1—Residual DPCM for HEVC lossless coding", JCT-VC Meeting; MPEG Meeting; Apr. 18-26, 2013; Incheon; (Joint Collaborative Team on Video Coding of ISO/IEC JTC1/SC29/WG11 and ITU-T SG.16); URL:HTTP://WFTP3.ITU.INT/AV-ARCH/JCTVC-SITE/, No. JCTVC-M0079, XP030114036, 8 pp.

Naccari et al., "Inter-Prediction Residual DPCM", JCT-VC Meeting; MPEG Meeting; Apr. 18-26, 2013; Incheon; (Joint Collaborative Team On Video Coding of ISO/IEC JTC1/SC29/WG11 and ITU-T SG.16 ); URL: HTTP://WFTP3.ITU.INT/AV-ARCH/JCTVC-SITE/, No. JCTVC-M0442, XP030114399, 12 pp.

Puri et al., "Video coding using the H.264/MPEG-4 AVC compression standard", Signal Processing. Image Communication, Elsevier Science Publishers, Amsterdam,NL, vol. 19, No. 9,Oct. 1, 2004, XP004607150, ISSN: 0923-5965, pp. 793-849.

Sole, et al., "Non-RCE2: Restriction on the Residual DPCM block size",JCT-VC Meeting; Jul. 25-Aug. 2, 2013; Vienna; (Joint Collaborative Team On Video Coding of ISO/IEC JTC1/SC29/WG11 and ITU-T SG.16) URL: HTTP://WFTP3.ITU.INT/AV-ARCH/JCTVC-SITE/, No. JCTVC-N0042, XP030114469, 3 pp.

Sullivan, et al., "Overview of the High Efficiency Video Coding (HEVC) Standard", IEEE Transactions on Circuits and Systems for Video Technology, IEEE Service Center, Piscataway, NJ, US, vol. 22 (12), Dec. 2012, pp. 1649-1668, XP011486324.

Cohen, et al., "Modified coefficient scan order mapping for transform skip mode," JCT-VC Meeting; MPEG Meeting; Jul. 11-20, 2012; (Joint Collaborative Team on Video Coding of ISO/IEC JTC1/SC29/WG11 and ITU-T SG.16); Document: JCTVC-J0313_r2, 10 pp.

Zhou, et al., "RCE2: Experimental results on Test 3 and Test 4," JCT-VC Meeting; MPEG Meeting; Apr. 18-26, 2013; (Joint Collaborative Team on Video Coding of ISO/IEC JTC1/SC29/WG11 and ITU-T SG.16 ); Document: JCTVC-M0056, 13 pp.

Sole, et al., "AhG8: Residue rotation and significance map context for screen content coding," JCT-VC Meeting; MPEG Meeting; Apr. 18-26, 2013; (Joint Collaborative Team on Video Coding of ISO/IEC JTC1/SC29/WG11 and ITU-T SG.16 ); Document: JCTVC-M0333, 5 pp.

Naccari, et al., "Inter-Prediction Residual DPCM," JCT-VC Meeting; MPEG Meeting; Apr. 18-26, 2013; (Joint Collaborative Team on Video Coding of ISO/IEC JTC1/SC29/WG11 and ITU-T SG. 16 ); Document: JCTVC-M0442_r1, 12 pp.

International Preliminary Report on Patentability from International Application No. PCT/US2014/041085, dated Aug. 21, 2014, 16 pp.

(56) References Cited

OTHER PUBLICATIONS

Response to Written Opinion dated Aug. 21, 2014, from International Application No. PCT/US2014/041085, filed on Nov. 18, 2014, 6 pp.
Second Written Opinion from International Application No. PCT/US2014/041085, dated Apr. 29, 2015, 4 pp.
Response to Second Written Opinion dated Apr. 29, 2015, from International Application No. PCT/US2014/041085, filed on Jun. 22, 2015, 26 pp.
International Preliminary Report on Patentability from International Application No. PCT/US2014/041085, dated Sep. 10, 2015, 14 pp.
Naccari M., et al., "Complexity reduction for residual DPCM in HEVC lossless coding", JCTVC-M0439_r1, 13th Meeting, Apr. 18-26, 2013, pp. 1-6, URL: http://phenix.it-sudparis.eu/jct/doc_end_user/documents/13_Incheon/wg11/JCTVC-M0439-v3.zip.

* cited by examiner

RESIDUAL DIFFERENTIAL PULSE CODE MODULATION (DPCM) EXTENSIONS AND HARMONIZATION WITH TRANSFORM SKIP, ROTATION, AND SCANS

This application claims the benefit of U.S. Provisional Application No. 61/831,581, filed Jun. 5, 2013, the entire content of which is incorporated herein by reference.

TECHNICAL FIELD

This disclosure relates to video coding and compression.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques perform spatial (intra-picture) prediction and/or temporal (inter-picture) prediction to reduce or remove redundancy inherent in video sequences. For block-based video coding, a video slice may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, one or more techniques described in the disclosure relate to harmonization of coding tools when residual differential pulse code modulation (residual DPCM or RDPCM) is applied. In some examples, if RDPCM is applied to a residual block, then no transform is applied to the residual block (i.e., RDPCM is applied only on residual blocks for which transform is skipped or bypassed). In some examples, if RDPCM is applied to a residual block generated from intra-predicting a current block, then a certain scan order is used on the residual block based on an order (e.g., direction) of the RDPCM.

The one or more techniques described in this disclosure extend this concept to inter-predicted and intra block copy (intra-BC) predicted blocks. For instance, the one or more techniques determine a scan order to use on a residual block generated from inter-prediction or intra-BC prediction, where RDPCM is applied, such that the determined scan order is the same scan order as would be used if the residual block were generated using intra-prediction and if the RDPCM with the same order (horizontal or vertical) were applied. In this manner, the techniques harmonize the scan order used for RDPCM for intra-prediction and inter- or intra-BC prediction.

In one example, the disclosure describes a method of decoding video data, the method comprising decoding information indicating a direction in which residual differential pulse code modulation (DPCM) is applied to a first residual block that includes residual data generated from a difference between a predictive block, referred to by a vector of a current block, and the current block, determining a scan order for the first residual block based on the information indicating the direction, wherein the determined scan order is required to be the same scan order as would be used on a second residual block if the second residual block was generated from intra-predicting the current block and if the second residual block had residual DPCM applied with the same direction as the direction indicated in the decoded information, entropy decoding the residual data of the first residual block based on the determined scan order, and reconstructing the current block based on the decoded residual data.

In one example, the disclosure describes a method of encoding video data, the method comprising determining a direction in which residual differential pulse code modulation (DPCM) is to be applied to a first residual block that includes residual data generated from a difference between a predictive block, referred to by a vector of a current block, and the current block, determining a scan order for the first residual block based on the determined direction in which the residual DPCM is applied, wherein the determined scan order is required to be the same scan order as would be used on a second residual block if the second residual block was generated from intra-predicting the current block and if the second residual block had residual DPCM applied with the same direction as the determined direction in which the residual DPCM is applied to the first residual block, entropy encoding the residual data of the first residual block based on the determined scan order, encoding information indicating the determined direction in which residual DPCM is applied, and outputting the encoded residual data and the information indicating the determined direction in which residual DPCM is applied.

In one example, the disclosure describes a device for decoding video data, the device comprising a video data memory configured to store a first residual block that includes residual data generated from a difference between a predictive block, referred to by a vector of a current block, and the current block, and a video decoder configured to decode information indicating a direction in which residual differential pulse code modulation (DPCM) is applied to the first residual block, determine a scan order for the first residual block based on the information indicating the direction, wherein the determined scan order is required to be the same scan order as would be used on a second residual block if the second residual block was generated from intra-predicting the current block and if the second residual block had residual DPCM applied with the same direction as the direction indicated in the decoded information, entropy decode the residual data of the first residual block based on the determined scan order, and reconstruct the current block based on the decoded residual data.

In one example, the disclosure describes a device for encoding video data, the device comprising a video data memory configured to store a predictive block for a current block, and a video encoder configured to determine a direction in which residual differential pulse code modulation (DPCM) is to be applied to a first residual block that includes residual data generated from a difference between the predictive block, referred to by a vector of the current block, and the current block, determine a scan order for the first residual block based on the determined direction in which the residual DPCM is applied, wherein the determined scan order is required to be the same scan order as would be used on a second residual block if the second residual block was generated from intra-predicting the current block and if the second residual block had residual DPCM applied with the same direction as the determined direction in which the residual DPCM is applied to the first residual block, entropy encode the residual data of the first residual block based on the determined scan order, encode information indicating the determined direction in which residual DPCM is applied, and output the encoded residual data and the information indicating the determined direction in which residual DPCM is applied.

In one example, the disclosure describes a device for decoding video data, the device comprising means for decoding information indicating a direction in which residual differential pulse code modulation (DPCM) is applied to a first residual block that includes residual data generated from a difference between a predictive block, referred to by a vector of a current block, and the current block, wherein the information indicating the direction comprises information indicating one of a vertical residual DPCM or a horizontal residual DPCM, means for determining a scan order for the first residual block based on the information indicating the direction, wherein the means for determining the scan order for the first residual block comprises means for determining a vertical scan, if the information indicated a horizontal residual DPCM and if the size of the first residual block is less than or equal to 8×8, and means for determining a horizontal scan, if the information indicated a vertical residual DPCM and if the size of the first residual block is less than or equal to 8×8. The device further comprising means for entropy decoding the residual data of the first residual block based on the determined scan order, and means for reconstructing the current block based on the decoded residual data.

In one example, the disclosure describes a computer-readable storage medium having instructions stored thereon that when executed cause a video encoder for a device for encoding video data to determine a direction in which residual differential pulse code modulation (DPCM) is to be applied to a first residual block that includes residual data generated from a difference between a predictive block, referred to by a vector of a current block, and the current block, wherein the determined direction comprises one of a vertical residual DPCM or a horizontal residual DPCM, determine a scan order for the first residual block based on the determined direction in which the residual DPCM is applied, wherein to determine the scan order of the first residual block the instructions cause the video encoder to determine a vertical scan, if the determined direction is the horizontal residual DPCM and if the size of the first residual block is less than or equal to 8×8, or determine a horizontal scan, if the determined direction is the vertical residual DPCM and if the size of the first residual block is less than or equal to 8×8, entropy encode the residual data of the first residual block based on the determined scan order, encode information indicating the determined direction in which residual DPCM is applied, and output the encoded residual data and the information indicating the determined direction in which residual DPCM is applied.

The details of one or more examples are set forth in the accompanying drawings and the description below. Other features, objects, and advantages will be apparent from the description and drawings, and from the claims.

DETAILED DESCRIPTION

Figure 1:
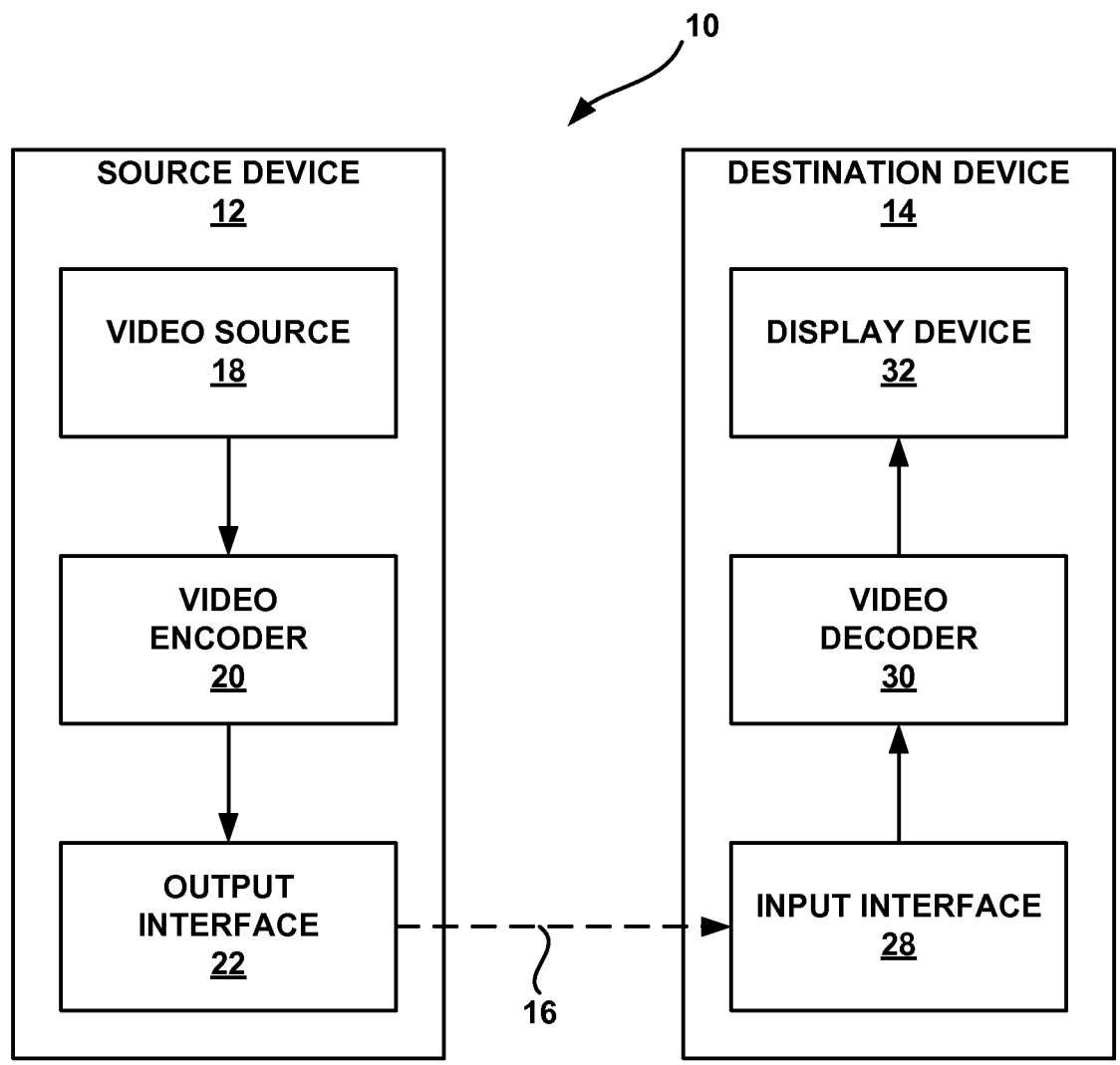
FIG. 1 is a block diagram illustrating an example video coding system that may utilize the techniques of this disclosure.

In video coding, a video coder (e.g., a video encoder or a video decoder) forms a predictive block. The video encoder determines a difference, referred to as a residual, between the predictive block and the current block (e.g., the block being predicted). The residual values form a residual block. The video decoder receives the residual block and adds the residual values of the residual block to the predictive block to reconstruct the current block. In inter-prediction, the predictive block is in a different picture than the current block or based on samples of a different picture and identified by a motion vector. In intra-prediction, the predictive block is formed from samples in the same picture as the current block and formed by an intra-prediction mode. In intra block copy (intra-BC) prediction, the predictive block is in the same picture as the current block and identified by a block vector.

To reduce the amount of data of a residual block that needs to be output, the video encoder may utilize differential pulse code modulation (DPCM) on the residual block, referred to as residual DPCM or RDPCM. For residual DPCM, the video encoder predicts the residual values of a row or column of the residual block based on the residual values of the previous row or column. As an example, the video encoder subtracts the residual values of row 1 from the reconstructed residual values of row 0 (e.g., subtract the first residual value of row 1 from the first residual value of row 0, subtract the second residual value of row 1 from the second residual value of row 0, and so forth). For row 0, the video encoder signals the residual values, but for row 1, the video encoder signals the difference values, and for row 2, the video encoder signals the difference values with the reconstructed values of row 1, and so forth. The video encoder may perform a similar technique for column based residual DPCM. Subtraction, as described in this disclosure, refers to determining values equal to the result of subtracting, and can be performed by subtracting or adding a negative of value.

In some examples, encoding the difference between residual values of successive rows or columns may result in fewer bits than encoding the actual residual values. In this manner, residual DPCM may result in a reduction in the amount of data the video encoder needs to signal, thereby promoting bandwidth efficiency.

The video decoder decodes the received values. For instance, the video decoder decodes the residual values for row 0, and decodes the difference values for row 1. The video decoder adds the residual values for row 0 with the difference values to determine the residual values for row 1. The video decoder also decodes the difference values for row 2 (e.g., the difference between the residual values of row 1 and the residual values of row 2). The video decoder adds the determined residual values for row 1 with the difference values of row 2 to determine the residual values of row 2, and so forth. The video decoder may implement similar steps for column based residual DPCM.

In some examples, the video encoder may utilize residual DPCM only in conjunction with certain other coding tools. For example, the video encoder may utilize lossless (also referred to as bypass) or transform-skip coding to generate the residual block or a quantized version of the residual block, respectively. In some examples, the video encoder may utilize residual DPCM only if the residual block is transform-bypass or transform-skip encoded. If a transform is applied to the residual block, then residual DPCM may not be available to the video encoder.

Also, the video encoder may rotate the residual block or quantized residual block by various degrees (e.g., 90, 180, or 270 degrees). Moreover, the video encoder may scan the coefficients of the residual block or quantized residual block in different orders (e.g., diagonal, horizontal, or vertical).

In some examples, the video encoder may be configured to harmonize the scan orders used for intra-prediction with scan orders used for inter-prediction or intra-BC prediction. For instance, if RDPCM is applied to a residual block generated from intra-predicting a current block, the video encoder may be configured to use a specific scan order to scan the RDPCM applied residual block. In the techniques described in this disclosure, the video encoder may be configured to require using the same scan order, as used for the intra-prediction case, to scan a residual block generated from inter-predicting the current block or intra-BC predicting the current block, when RDPCM is applied to the residual block.

The video decoder may be configured in a similar way. For example, the video decoder may use the same scan order as the video encoder utilized. For instance, if RDPCM is applied to a residual block generated from intra-predicting a current block, the video decoder may be configured to use the same scan order to scan the RDPCM applied residual block as the video encoder used. In the techniques described in this disclosure, similar to the video encoder, the video decoder may be configured to require using the same scan order, as used for the intra-prediction case, to scan a residual block generated from inter-predicting the current block or intra-BC predicting the current block, when RDPCM is applied to the residual block.

In this manner, the process of selecting a scan order may be simplified. For example, rather than using different criteria for determining the scan order for a residual block where RDPCM is applied for intra-predicted blocks and inter- or intra-BC predicted blocks, the video encoder may use the same criteria for determining the scan order for a residual block where RDPCM is applied for intra-predicted blocks and inter- or intra-BC predicted blocks. The video decoder may similarly use the same criteria. As described above, in some examples, for RDPCM to be applied, the residual block may need to be transform-bypass or transform-skip coded.

Such simplification of the scan order selection may promote video encoding and decoding efficiencies. For instance, the video decoder may be configured to select the scan order for an RDPCM applied residual block based on the RDPCM direction (e.g., order), irrespective of whether the prediction was generated using intra prediction, intra block copy prediction or inter prediction. This may limit or reduce branching behavior. For instance, if the video decoder were configured in different ways to select the scan order for intra-prediction and inter- or intra-BC prediction, where RDPCM is applied, then the video decoder may waste computation cycles determining whether the current block is intra-predicted or inter- or intra-BC predicted, where RDPCM is applied, to select the appropriate scan order.

FIG. 1 is a block diagram illustrating an example video coding system 10 that may utilize the techniques of this disclosure. As described herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). Channel 16 may include various types of devices, such as routers, switches, base stations, or other equipment that facilitate communication from source device 12 to destination device 14.

In another example, channel 16 may include a storage medium that stores encoded video data generated by source device 12. In this example, destination device 14 may access the storage medium (e.g., via disk access or card access). The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device (e.g., via streaming or download). The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions (e.g., via the Internet), encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device (e.g., a video camera), a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In some examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

In some examples, video encoder 20 and video decoder 30 operate according to a video compression standard, such as the High Efficiency Video Coding (HEVC) standard or its extensions such as HEVC range extensions. A draft of the HEVC standard, referred to as "HEVC Working Draft 10" or "WD10," is described in Bross et al., "High Efficiency Video Coding (HEVC) text specification draft 10 (for FDIS & Consent)," Joint Collaborative Team on Video Coding (JCT-VC) of ITU-T SG16 WP3 and ISO/IEC JTC1/SC29/WG11, 12th Meeting: Geneva, CH, 14-23 Jan. 2013 the entire content of which is incorporated herein by reference. The techniques of this disclosure, however, are not limited to any particular coding standard or technique.

FIG. 1 is merely an example and the techniques of this disclosure may apply to video coding settings (e.g., video encoding or video decoding) that do not necessarily include any data communication between the video encoding device and the video decoding device. In other examples, data is retrieved from a local memory, streamed over a network, or the like. A video encoding device may encode and store data to memory, and/or a video decoding device may retrieve and decode data from memory. In many examples, the video encoding and decoding is performed by devices that do not communicate with one another, but simply encode data to memory and/or retrieve and decode data from memory.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which a video decoding device may then retrieve at any time after being stored to this medium.

As mentioned briefly above, video encoder 20 encodes video data. The video data may comprise one or more pictures. Each of the pictures is a still image forming part of a video. When video encoder 20 encodes the video data, video encoder 20 may generate a bitstream. The bitstream may include a sequence of bits that forms a coded representation of the video data. The bitstream may include coded pictures and associated data. A coded picture is a coded representation of a picture. The associated data may include video parameter sets (VPSs), sequence parameter sets (SPSs), picture parameter sets (PPSs), and other syntax structures. A SPS may contain parameters applicable to zero or more sequences of pictures. A PPS may contain parameters applicable to zero or more pictures.

A picture may include three sample arrays, denoted $S_L$, $S_{Cb}$ and $S_{Cr}$. $S_L$ is a two-dimensional array (i.e., a block) of luma samples. Luma samples may also be referred to herein as "Y" samples. $S_{Cb}$ is a two-dimensional array of Cb chrominance samples. $S_{Cr}$ is a two-dimensional array of Cr chrominance samples. Chrominance samples may also be referred to herein as "chroma" samples. Cb chrominance samples may be referred to herein as "U samples." Cr chrominance samples may be referred to herein as "V samples."

In some examples, video encoder 20 may down-sample the chroma arrays of a picture (i.e., $S_{Cb}$ and $S_{Cr}$). For example, video encoder 20 may use a YUV 4:2:0 video format, a YUV 4:2:2 video format, or a 4:4:4 video format. In the YUV 4:2:0 video format, video encoder 20 may down-sample the chroma arrays such that the chroma arrays are ½ the height and ½ the width of the luma array. In the YUV 4:2:2 video format, video encoder 20 may down-sample the chroma arrays such that the chroma arrays are ½ the width and the same height as the luma array. In the YUV 4:4:4 video format, video encoder 20 does not down-sample the chroma arrays.

To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs).

As part of encoding a picture, video encoder 20 may generate encoded representations of each slice of the picture (i.e., coded slices). To generate a coded slice, video encoder 20 may encode a series of CTUs. This disclosure may refer to an encoded representation of a CTU as a coded CTU. In some examples, each of the slices includes an integer number of coded CTUs.

To generate a coded CTU, video encoder 20 may recursively perform quad-tree partitioning on the coding tree blocks of a CTU to divide the coding tree blocks into one or more coding blocks, hence the name "coding tree units." A coding block is an N×N block of samples. In some examples, a CU may be a coding block of luma samples and two corresponding coding blocks of chroma samples of a picture that has a luma sample array, a Cb sample array and a Cr sample array, and syntax structures used to code the samples of the coding blocks. Video encoder 20 may partition a coding block of a CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU.

Video encoder 20 may use intra-prediction, inter-prediction, or intra block copy (intra-BC) prediction to generate (e.g., form or identify) the predictive blocks for a PU. If video encoder 20 uses intra-prediction, video encoder 20 may form the predictive blocks of the PU based on decoded samples of the picture associated with the PU.

If video encoder 20 uses inter-prediction, video encoder 20 may identify the predictive blocks of the PU based on decoded samples of one or more pictures other than the picture associated with the PU. Video encoder 20 may use uni-prediction or bi-prediction to generate the predictive blocks of a PU. When video encoder 20 uses uni-prediction to generate the predictive blocks for a PU, the PU may have a single motion vector (MV) that refers to the predictive block. When video encoder 20 uses bi-prediction to generate the predictive blocks for a PU, the PU may have two MVs (each one referring to different predictive blocks).

If video encoder 20 uses intra-BC prediction to identify the predictive blocks of a PU, video encoder 20 may identify the predictive blocks of the PU based on decoded samples of the picture associated with the PU. Intra-prediction may form the predictive blocks of the PU based on decoded samples of the picture associated with the PU (i.e., the picture containing the PU). However, unlike intra-prediction, the predictive block is identified by a vector, referred to as a block vector, whereas the predictive block in intra-prediction is formed based on an intra-prediction mode. Accordingly, intra-BC prediction is similar to intra-prediction in that the predictive block for both is in or based on samples of the same picture as the PU, but different in that intra-BC prediction relies on a block vector to identify the predictive block where intra-prediction is based on an intra-prediction mode to form the predictive block. Also, intra-BC prediction is similar to inter-prediction in that the predictive block for both is referred to by a vector (e.g., motion vector for inter-prediction and block vector for intra-BC prediction), but different in that the predictive block is in the same picture or based on samples of the same picture in intra-BC prediction and in a different picture in inter-prediction.

After video encoder 20 identifies predictive blocks (e.g., luma, Cb and Cr blocks) for one or more PUs of a CU, video encoder 20 may generate one or more residual blocks for the CU. Each sample in a residual block may indicate a difference between a sample in one of the CU's predictive blocks and a corresponding sample in one of the CU's original coding blocks. For example, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the residual blocks (e.g., luma, Cb and Cr residual blocks) of a CU into one or more transform blocks (e.g., luma, Cb and Cr transform blocks). A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

In some, but not all examples, video encoder 20 may apply one or more transforms to a transform block (e.g., luma transform block) of a TU. The transform the convert the values from a pixel domain to a transform domain. Video encoder 20 may apply transforms to the transform block to generate a luma coefficient block for the TU, as one example. A coefficient block may be a two-dimensional array of transform coefficients. A transform coefficient may be a scalar quantity. In some, but not all examples, video encoder 20 may apply one or more transforms to a Cb transform block of a TU to generate a Cb coefficient block for the TU. In some, but not all examples, video encoder 20 may apply one or more transforms to a Cr transform block of a TU to generate a Cr coefficient block for the TU.

After generating a coefficient block (e.g., a luma coefficient block, a Cb coefficient block or a Cr coefficient block), in some, but not all examples, video encoder 20 may quantize the coefficient block. Quantization generally refers to a process in which transform coefficients are quantized to possibly reduce the amount of data used to represent the transform coefficients, providing further compression.

After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. For entropy coding, video encoder 20 scans the quantized transform coefficients according to a particular scan order (e.g., vertical scan, horizontal scan, or diagonal scan). Video encoder 20 may output the entropy-encoded syntax elements in a bitstream.

Transforming and quantizing the residual block causes loss of information (e.g., inverse quantized and inverse transformed block is different than the original residual block). Accordingly, examples of video coding where the residual block is transformed and quantized are referred to as lossy coding. In some examples, video encoder 20 may skip the transform of the residual block, but quantizes the residual block. Such examples of video coding are referred to as transform-skip coding. Transform-skip coding may be one variation of lossy coding because the quantization causes of loss of information. To avoid confusion, lossy coding is used in this description to refer to video coding methods that include both transform and quantization, and transform-skip coding is used in this description to refer to video coding methods in which the transform is skipped, but quantization is still performed.

Video encoder 20 need not perform transform-skip coding or lossy coding in all cases. In some examples, video encoder 20 may perform lossless coding. In lossless coding (sometimes referred to as transquant bypass), video encoder 20 does not transform the residual block and does not quantize the residual block. In this example, the residual block, as reconstructed by video decoder 30, is identical to the residual block generated by video encoder 20, whereas for lossy coding and transform-skip coding, the residual block, as reconstructed by video decoder 30, may be slightly different than the residual block generated by video encoder 20.

In other words, when transform is applied, the transform converts the residual values of the residual data of the residual block from a pixel domain to a transform domain. In some examples, for transform skip or transform bypass, the residual data includes residual values from the difference between the predictive block and the current block without a transform applied to the residual values that converts the residual values from a pixel domain to a transform domain.

Video decoder 30 may receive a bitstream generated by video encoder 20. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20.

That is, video decoder 30 may entropy decode syntax elements in the bitstream to determine quantized transform coefficients for lossy coding, and may utilize the same scan order that video encoder 20 utilized to construct a quantized residual block. For lossy coding, video decoder 30 may then inverse quantize the quantized transform coefficients to determine the transform coefficients. Furthermore, for lossy coding, video decoder 30 may apply an inverse transform to the transform coefficients to determine the coefficients of the residual block.

However, for transform-skip coding, video decoder 30 may entropy decode syntax elements in the bitstream to determine quantized coefficients, utilize the same scan order that video encoder 20 utilized to construct a quantized residual block, and then inverse quantize the quantized coefficients to determine the coefficients of the residual block. No inverse transform is needed because transform was skipped in the encoding process. For lossless coding (e.g., transform bypass or simply bypass), video decoder 30 may entropy decode syntax elements in the bitstream and may utilize the same scan order video encoder 20 used to directly determine the coefficients of the residual block. No inverse quantizing or transform is needed because both transform and quantization was skipped in the encoding process.

Video decoder 30 determines a predictive block in the same picture (e.g., for intra-prediction or for intra-BC prediction) or in a different picture (e.g., for inter-prediction) as the current block. Video decoder 30 uses pixel values in the predictive block and the corresponding residual values in the residual block to reconstruct pixel values of the current block (e.g., to decode the current block).

For instance, video decoder 30 may use MVs or block vectors of PUs to determine predictive sample blocks (i.e., predictive blocks) for the PUs of a current CU. In addition, if video encoder 20 performed quantization, then video decoder 30 may inverse quantize (e.g., the inverse of the quantization performed by video encoder 20) residual data associated with the current CU. Similarly, if video encoder 20 performed a transform, then video decoder 30 may perform inverse transforms (e.g., the inverse of the transform performed by video encoder 20) on the transform coefficient blocks to reconstruct transform blocks associated with the TUs of the current CU. Video decoder 30 may reconstruct the coding blocks of the current CU by adding the samples of the predictive sample blocks for PUs of the current CU to corresponding samples of the transform blocks of the TUs of the current CU. By reconstructing the coding blocks for each CU of a picture, video decoder 30 may reconstruct the picture.

In the techniques described in this disclosure, another way to reduce the amount of video data that needs to be signaled, video encoder 20 may apply residual differential pulse code modulation (residual DPCM or RDPCM) to the residual blocks. In some examples, video encoder 20 may apply residual DPCM only if the transform is skipped or bypassed.

Video decoder 30 may apply the inverse of the RDPCM to reconstruct the residual blocks.

Video encoder 20 may apply RDPCM in different orders (e.g., a horizontal order or a vertical order), or may not apply RDPCM, resulting in three modes: horizontal RDPCM, vertical RDPCM, and no RDPCM. In some examples, video encoder 20 may signal syntax elements that indicate the order in which RDPCM is applied (e.g., indicate the mode) that video decoder 30 uses for decoding the residual block.

Figure 4B:
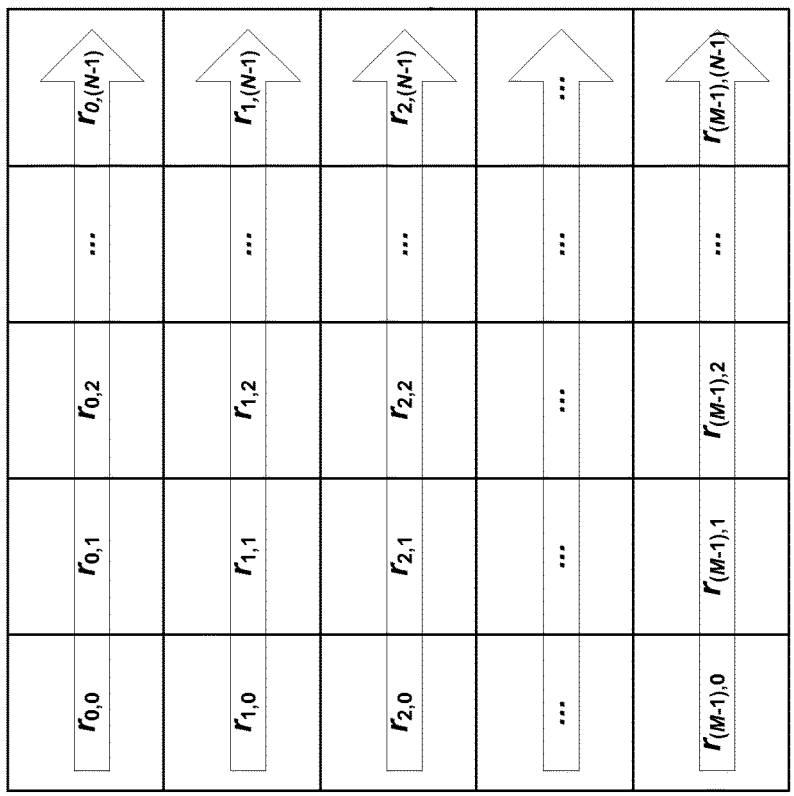
FIG. 4B shows a residual DPCM direction for near-horizontal modes.

The basic idea behind residual DPCM is to use the upper row value for predicting the current value for vertical mode and using the left column value for predicting the current value for vertical mode. For example, assume there is a block of size M (rows)×N (cols). In this example, let $r_{ij}$, $0 \leq i \leq (M-1)$, $0 \leq j \leq (N-1)$ be the prediction residual block after performing intra-prediction or motion compensated inter-prediction as specified in the HEVC specification or intra-BC prediction. This is shown in FIGS. 4A and 4B.

Figure 4A:
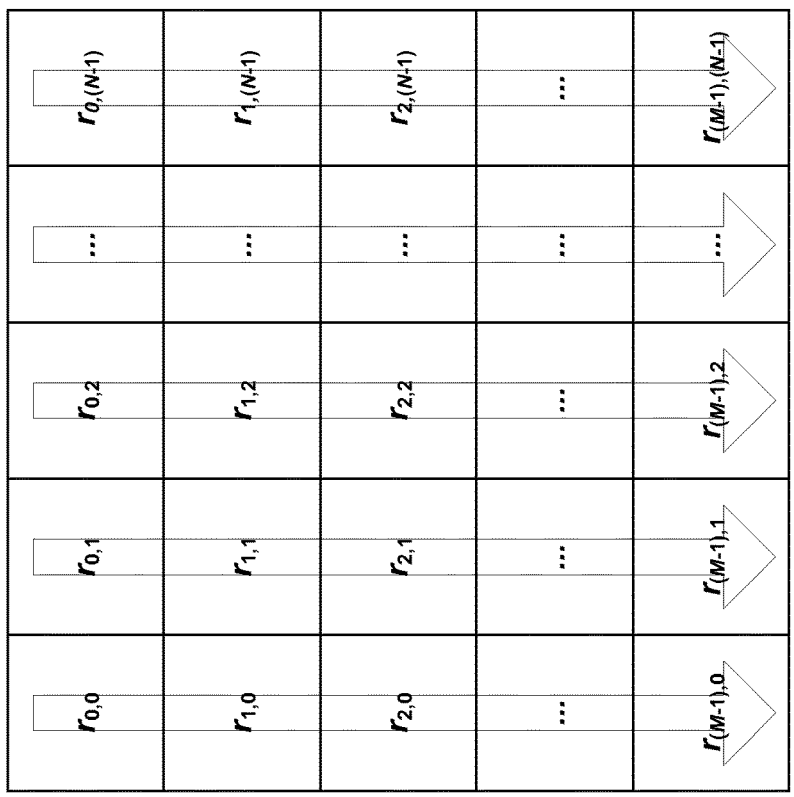
FIG. 4A shows a residual DPCM direction for near-vertical modes.

FIG. 4A shows a residual DPCM direction for near-vertical modes. FIG. 4B shows a residual DPCM direction for near-horizontal modes. The residual block, in FIG. 4A or FIG. 4B, could represent any component (e.g. luma, chroma, R, G, B etc.).

In residual DPCM, prediction is applied to the residual samples, so that a modified M×N array $\tilde{R}$ with elements $\tilde{r}_{i,j}$ is obtained as follows for vertical residual DPCM:

$$\tilde{r}_{i,j} = \begin{cases} r_{i,j}, & i = 0, 0 \leq j \leq (N-1) \\ r_{i,j} - r_{(i-1),j}, & 1 \leq i \leq (M-1), 0 \leq j \leq (N-1) \end{cases},$$

or for horizontal RDPCM:

$$\tilde{r}_{i,j} = \begin{cases} r_{i,j}, & 0 \leq i \leq (M-1), j = 0 \\ r_{i,j} - r_{i,(j-1)}, & 0 \leq i \leq (M-1), 1 \leq j \leq (N-1) \end{cases}.$$

Video encoder 20 signals the modified residual samples of $\tilde{R}$ that video decoder 30 receives, instead of the original residual samples R. In other words, if the residual block included samples R, then video encoder 20 may determine the modified residual samples $\tilde{R}$, which represents the residual block with RDPCM applied. If transform and quantization is performed (e.g., the lossy case), or if transform is skipped by quantization is performed (e.g., the transform-skip case), or if both transform and quantization is skipped (e.g. the lossless case), video encoder 20 performs such functions on the residual block with RDPCM applied, and signals the resulting bitstream from which video decoder 30 reconstructs (e.g., decodes) the residual samples of the original residual block (e.g., residual samples of the residual block prior to RDPCM, transform, and/or quantization)

At the video decoder 30 side, the original residual samples can be reconstructed after the modified residual samples are parsed as follows for vertical RDPCM:

$$r_{i,j} = \sum_{k=0}^{i} \tilde{r}_{k,j}, 0 \leq i \leq (M-1), 0 \leq j \leq (N-1),$$

or for horizontal RDPCM:

$$r_{i,j} = \sum_{k=0}^{j} \tilde{r}_{i,k}, 0 \leq i \leq (M-1), 0 \leq j \leq (N-1).$$

In some examples, for lossless case, transform is skipped for all TU sizes whereas for the lossy case, transform can be skipped only for 4×4 blocks. Also, in some examples, for intra blocks, horizontal or vertical scans may be used, but may be restricted to 4×4 and 8×8 block sizes. The techniques described in this disclosure are directed to harmonization of or various restrictions on residual blocks to which RDPCM may be applied based on scans and rotation (as in document JCTVC-M0333 titled "AhG8: Residue rotation and significance map context for screen content coding" by Sole Rojals et al., U.S. Provisional Application Nos. 61/670,569, 61/815,148, 61/833,781, and 61/890,102, and U.S. application Ser. Nos. 13/939,037 and 14/259,046, the entire contents of all are incorporated by reference herein.

The following provides some additional context for residual DPCM. At an April 2013 meeting, in Incheon, South Korea, of the Joint Collaborative Team on Video Coding (JCTVC), residual differential pulse code modulation (residual DPCM or RDPCM) or equivalently Sample Adaptive Angular Intra Prediction (SAP) or SAP-HV was adopted into the draft specification for the High Efficiency Video Coding (HEVC) standard range extensions. Residual DPCM is described in document JCTVC-M0079, titled "RCE2: Test 1—Residual DPCM for HEVC lossless coding" by Lee et al. SAP-HV is described in document JCTVC-M0056, Test 4, titled "RCE2: Experimental results on Test 3 and Test 4" by Zhou et al. The documents JCTVC-M0079 and JCTVC-M0056 are incorporated herein by reference in their entirety.

Residual DPCM applies DPCM to the prediction residuals of INTRA vertical and INTRA horizontal mode for lossless coding (e.g., intra-prediction for video coding). U.S. Provisional Application Nos. 61/809,870, 61/810,218, and 61/843,144 and U.S. application Ser. No. 14/223,874), the entire contents of each of which are incorporated herein by reference, describe how residual DPCM may be extended to coding of INTRA vertical and INTRA horizontal modes when transform is skipped (e.g., transform-skip coding).

In document JCTVC-M0442, titled "Inter-Prediction Residual DPCM" by Naccari et al., the contents of which are incorporated herein by reference in their entirety, extension of residual DPCM to INTER blocks for lossless coding mode is proposed (e.g., inter-prediction for video coding). Residual DPCM is applied to the motion compensated prediction residual. In some examples, residual DPCM may also be applied to the prediction residual generated from intra-BC prediction.

This disclosure describes techniques with respect to the following examples. It should be understood that the following examples are merely provided for purposes of illustration and should not be considered limiting. Moreover, the examples should not necessarily be considered as being mutually exclusive and the one or more of the techniques described in the examples may be combined with one another. In other words, combination or permutation of the example techniques described in this disclosure may be possible, and are contemplated by this disclosure.

As described above, video encoder 20 may apply RDPCM to residual blocks generated from intra-prediction, inter-prediction, or intra-BC prediction, and if RDPCM is applied, video encoder 20 applies a particular order of the RDPCM (e.g., RDPCM direction such as horizontal RDPCM or vertical RDPCM). In some examples, video encoder 20 applies RDPCM only if the residual block is transform-skip or transform-bypass coded. In other words, if a transform is applied to the residual block (e.g., residual block is not transform-skip or transform-bypass coded), then video encoder 20 may not apply RDPCM.

The residual block may correspond to a TU. In some examples, video encoder 20 may divide the residual block into a plurality of TUs. To avoid confusion, this disclosure uses the term "residual block" to refer generically to a block whose coefficients are to be entropy encoded (e.g., by video encoder 20) or entropy decoded (e.g., by video decoder 30). For instance, if video encoder 20 does not further divide the block resulting from the difference between the current block and a predictive block to generate a single TU, then the residual block corresponds the TU. If video encoder 20 divides the block resulting from the difference between the current block and a predictive block to generate a plurality of TUs, then the residual block corresponds to one of the plurality of TUs.

In some examples, for inter-predicted or intra-BC predicted blocks, video encoder 20 signals whether RDPCM is on or off (e.g., whether RDPCM is applied or not) and direction of the RDPCM (if applied) at the TU level. In these examples, the block resulting from the difference between the predictive block and the original block is divided into TUs and then video encoder 20 signals information (e.g., syntax elements such as a flag) indicating whether RDPCM is applied or not and information of the direction of the RDPCM (if applied) for each TU.

In some examples, rather than at the TU level, video encoder 20 may signal the information indicating whether RDPCM is applied or not and the direction (e.g., mode/direction information of RDPCM) at CU or PU level. In these examples, the same mode/direction would be applicable to all TUs.

Video decoder 30 applies scans to the coefficient values based on a scan order, and this disclosure describes techniques for determining the scan order. For example, for a residual block (e.g., a TU), video encoder 20 and video decoder 30 may apply the same scan order if RDPCM is applied to an inter-predicted or intra-BC predicted block that video encoder 20 and video decoder 30 would apply if the residual block was intra-predicted. Examples of the scan order include diagonal, horizontal, and vertical. In some examples, horizontal and vertical scans may only be applicable if the residual block size equal to or less than a threshold size (e.g., the block size of a TU is 8×8 or less). However, in some examples, the scans may be available for other sizes as well, including all sizes. In these examples, the threshold size may be some other size other than 8×8 or the largest possible block size.

In some examples, for intra-predicted blocks, RDPCM may be applied to all residual block sizes (e.g., TU sizes), but only for certain intra-prediction modes. For example, for horizontal intra-prediction mode, video encoder 20 may apply horizontal RDPCM, and for vertical intra-prediction mode, video encoder 20 may apply vertical RDPCM. If RDPCM is applied for an intra-predicted block, video encoder 20 may not need to signal the RDPCM order (e.g., RDPCM direction). Rather, video encoder 20 may signal information indicating the intra-prediction mode, and video decoder 30 may determine that the RDPCM direction is the same as the intra-prediction mode, in this example.

In this way, for TUs (e.g., residual blocks) generated from intra-prediction, the application of RDPCM may be implicit in that video encoder 20 may not signal information indicating the RDPCM direction because video decoder 30 may determine the RDPCM direction without receiving information indicating the RDPCM direction. For example, for a residual block generated from intra-prediction, video encoder 20 may always apply RDPCM for certain intra-prediction modes (e.g., horizontal or vertical modes), and may determine the RDPCM order (e.g., direction) based on the intra-prediction mode (e.g., horizontal RDPCM if horizontal intra-prediction mode and vertical RDPCM if vertical intra-prediction mode). In these examples, video encoder 20 may signal information indicating the intra-prediction mode, from which video decoder 30 may determine whether RDPCM is applied and the direction of the RDPCM without receiving explicit information indicating whether RDPCM is applied and the direction of the RDPCM.

However, for inter-prediction or intra-BC prediction, RDPCM may not always be applied. For example, video encoder 20 may determine whether RDPCM should be applied for a residual block generated from inter-predicting or intra-BC predicting a current block, and apply RDPCM if determined to do so. Accordingly, unlike for intra-prediction, for inter-predicted or intra-BC predicted blocks, video encoder 20 may generate for output (e.g., signal), in a bitstream, information that indicates whether RDPCM is applied to a residual block generated from inter-prediction or intra-BC prediction of the current block. Also, if RDPCM is applied, video encoder 20 may generate for output (e.g., signal), in the bitstream, information that indicates the order (e.g., direction) in which the RDPCM is applied. Video decoder 30 may receive and decode the information indicating whether RDPCM is applied, and if so, receive and decode the order (e.g., direction) in which the RDPCM is applied.

For a residual block, regardless of whether RDPCM is applied or not, video encoder 20 scans the coefficients of the residual block using a particular scan order (e.g., vertical scan, horizontal scan, or diagonal scan). As an example, for a TU of size greater than or equal to 8×8, video encoder 20 may divide the TU into a plurality of 4×4 sub-blocks. Video encoder 20 may scan the coefficients of each sub-block in the manner defined by the scan order. Video decoder 30 may similarly recompile the coefficients of the 4×4 sub-blocks of the TU based on the same scan order as used by video encoder 20 to reconstruct the coefficients of the TU.

It may be possible for video encoder 20 to determine the scan order used for scanning the coefficients, and signal information indicating the scan order to video decoder 30 so that video decoder 30 uses the same scan order that video encoder 20 used. However, to reduce the amount of data that needs to be signaled, in some examples, video encoder 20 and video decoder 30 may each use the same process and criteria to determine the scan order for a residual block. In this way, video encoder 20 does not need to signal and video decoder 30 does not need to receive information indicating the scan order.

For instance, video encoder 20 and video decoder 30 may be configured to determine, based on the order of the applied RDPCM (e.g., direction of the applied RDPCM) for a residual block generated using intra-prediction, the scan order for a residual block (e.g., TU) generated using intra-prediction. In some examples, the techniques that video encoder 20 and video decoder 30 use to determine the scan order for a residual block generated from intra-prediction may be useable for cases where no transform is performed on the residual block (e.g., the transform skip case or the lossless (transform bypass) case). However, the techniques described in this disclosure should not be considered limited to only the cases where transform is skipped, either for transform skip or for lossless coding.

As an example, in one of the draft specification for HEVC range extensions, when vertical RDPCM is applied to a residual block generated from an intra-predicted current block in vertical mode, video encoder 20 and video decoder 30 may determine the scan order to be a horizontal scan that is used across 4×4 sub-blocks of the residual block and within each 4×4 sub-block of the residual block for residual block sizes up to a threshold size (e.g., 8×8). Similarly, when horizontal RDPCM is applied to a residual block generated from an intra-predicted current block in horizontal mode, video encoder 20 and video decoder 30 may determine the scan order to be a vertical scan that is used across 4×4 sub-blocks of the residual block and within each 4×4 sub-block of the residual block for residual block sizes up to a threshold size (e.g., 8×8). If the residual block size is larger than 8×8, then video encoder 20 and video decoder 30 may be configured to utilize the diagonal scan.

In the above example, video encoder 20 and video decoder 30 may be configured to determine the scan order to be the scan order that is orthogonal to the RDPCM order (e.g., horizontal scan for vertical RDPCM and vertical scan for horizontal RDPCM). However, the techniques described in this disclosure are not so limited.

For instance, in document JCTVC-J0313, titled "Modified coefficient scan order mapping for transform skip mode" by Cohen et al., the contents of which are incorporated herein by reference in their entirety, it was proposed to swap the horizontal and vertical scan orders when the transform was skipped or bypassed. In this case, if video encoder 20 and video decoder 30 would have used a horizontal scan for a residual block generated for an intra-predicted current block, then based on the JCTVC-J0313 techniques, video encoder 20 and video decoder 30 use a vertical scan for the residual block generated for the intra-predicted current block. Also, if video encoder 20 and video decoder 30 would have used a vertical scan for a residual block generated for an intra-predicted current block, then based on the JCTVC-J0313 techniques, video encoder 20 and video decoder 30 use a horizontal scan for the residual block generated for the intra-predicted current block.

In the techniques described in this disclosure, video encoder 20 and video decoder 30 may utilize the same criteria to determine the scan order for a residual block with RDPCM applied that is generated for an inter-predicted current block or an intra-BC predicted current block as the criteria that video encoder 20 and video decoder 30 utilize to determine the scan order for a residual block with RDPCM applied that is generated for an intra-predicted current block. In this manner, the techniques described in this disclosure harmonize the techniques for determining the scan order to be used for scanning coefficients for residual blocks for intra-prediction, inter-prediction, and intra-BC prediction.

For example, the techniques described in this disclosure may extend the scheme used to determine the scan order for an RDPCM applied residual block generated from intra-prediction to an RDPCM applied residual block generated from inter-prediction or intra-BC prediction. For instance, video encoder 20 and video decoder 30 may determine a scan order for a residual block generated from a difference between a predictive block, referred to by a vector of a current block, and the current block based on the order in which the RDPCM is applied to the residual block. Examples of a residual block generated from a difference between a predictive block, referred to by a vector of a current block, and the current block include a residual block generated from inter-predicting or a residual block generated from intra-BC predicting the current block.

In the techniques described in this disclosure, the scan order that video encoder 20 and video decoder 30 determine for the residual block generated from inter-predicting or intra-BC predicting the current block is the same scan order as would be used on a residual block that includes residual data if the residual block was generated from intra-predicting the current block and had RDPCM applied with the same order as the RDPCM applied to the residual block generated from inter-predicting or intra-BC predicting the current block. The scan order for the residual block generated from inter-prediction or intra-BC prediction being same as the scan order for the residual block generated from intra-prediction is described as a requirement to assist with understanding. However, video encoder 20 and video decoder 30 need not be required to determine how a residual block generated from intra-prediction would be scanned to determine how a residual block generated from inter-prediction or intra-BC prediction should be scanned. Rather, video encoder 20 and video decoder 30 may be configured to utilize the same criteria for determining the scan order for a residual block generated from inter or intra-BC prediction as would be used to determine scan order for a residual block generated from intra-prediction.

For instance, similar to the intra-prediction example, in some examples of inter-prediction or intra-BC prediction, video encoder 20 may apply RDPCM only to a TU (e.g., a residual block) for which transform is skipped or bypassed. Also, for inter-prediction or intra-BC prediction, video encoder 20 may signal information indicating whether RDPCM is applied to the residual (e.g., TU) and if so, the direction (e.g., order) of the RDPCM. Based on the signaled information, video decoder 30 may determine the scan order for the residual block. In this way, video encoder 20 may not need to signal information indicating the scan order, and video decoder 30 may determine the scan order based on the direction of the RDPCM.

As described above, the scan order for a residual block may be one of a horizontal scan, a vertical scan, and a diagonal scan. Video encoder 20 and video decoder 30 may utilize the horizontal scan or the vertical scan for TU sizes (e.g., residual block sizes) of up to a threshold size (e.g., 8×8). If the TU size is greater than the threshold size (e.g., greater than 8×8), video encoder 20 and video decoder 30 may utilize a diagonal scan.

For instance, in some examples, if horizontal RDPCM is applied to a residual block generated from intra-predicting a current block, then video encoder 20 and video decoder 30 determine the scan order to be a vertical scan. In these examples, if a horizontal RDPCM is applied to a residual block generated from inter- or intra-BC prediction, then video encoder 20 and video decoder 30 determine the scan order to be a vertical scan for a residual block (e.g., TU) size of up to a threshold size (e.g., 8×8), just like for the case where the residual block is generated from intra-prediction. Similarly, in some examples, if vertical RDPCM is applied to a residual block generated from intra-predicting a current block, then video encoder 20 and video decoder 30 determine the scan order to be a horizontal scan. In these examples, if a vertical RDPCM is applied to a residual block generated from inter- or intra-BC prediction, then video encoder 20 and video decoder 30 determine the scan order to be a horizontal scan for a residual block (e.g., TU) size of up to a threshold size (e.g., 8×8), just like for the case where the residual block is generated from intra-prediction.

In some cases, such as those described in JCTVC-J0313, if horizontal RDPCM is applied to a residual block generated from intra-predicting a current block, then video encoder 20 and video decoder 30 determine the scan order to be a horizontal scan. In these examples, if a horizontal RDPCM is applied to a residual block generated from inter- or intra-BC prediction, then video encoder 20 and video decoder 30 determine the scan order to be a horizontal scan for a residual block size of up to a threshold size (e.g., 8×8), just like for the case where the residual block is generated from intra-prediction in the techniques described in JCTVC-J0313. Similarly, in the techniques described in JCTVC-J0313, if vertical RDPCM is applied to a residual block generated from intra-predicting a current block, then video encoder 20 and video decoder 30 determine the scan order to be a vertical scan. In these examples, if a vertical RDPCM is applied to a residual block generated from inter- or intra-BC prediction, then video encoder 20 and video decoder 30 determine the scan order to be a vertical scan for a residual block size of up to a threshold size (e.g., 8×8), just like for the case where the residual block is generated from intra-prediction.

As described above, in examples where the residual block is generated from inter-prediction or intra-BC prediction, video encoder 20 may encode information (e.g., generate for output and signal) that indicates the order (e.g., direction) in which the RDPCM is applied (e.g., whether vertical or horizontal RDPCM is applied). Video decoder 30 may decode information that indicates the order in which the RDPCM is applied, and may determine the scan order as described above. In some cases, the above examples may be applicable for residual block sizes of up to 8×8 (e.g., horizontal or vertical scan orders may be usable for block sizes of up to 8×8, and diagonal scans for sizes greater than 8×8).

In the examples described above, video encoder 20 and video decoder 30 may apply a horizontal scan or a vertical scan only for residual blocks with block sizes less than or equal to a threshold size (e.g., 8×8). In these examples, video encoder 20 and video decoder 30 may determine whether a size of the residual block is less than or equal to the threshold size. Video encoder 20 and video decoder 30 may determine the scan order for the residual block based on the RDPCM direction (e.g., horizontal or vertical) and whether the size of the residual block is less than or equal to the threshold size.

Furthermore, RDPCM may not be applied in all instances for when the residual block is generated from inter-prediction or intra-BC prediction. For instance, if video encoder 20 determined that RDPCM does not need to be applied for inter- or intra-BC prediction, then video encoder 20 may signal information indicating that RDPCM is not applied. In such cases where RDPCM is not applied, video encoder 20 and video decoder 30 may determine the scan order to be a diagonal scan. Even in this case there may be harmonization with intra-prediction. For example, where RDPCM is not applied to a residual block generated with intra-prediction and with transform-skip, the scan may be diagonal.

For the residual block generated from inter-prediction or intra-BC prediction, if RDPCM is applied, video encoder 20 encodes information that indicates that RDPCM is applied. In some examples, video encoder 20 may encode such information at a PU level or CU level, instead of a TU level. In these examples, video encoder 20 and video decoder 30 may determine the scan order to be one of a vertical scan or a horizontal scan for all TUs which do not cross the PU boundary in case of PU level coding and which satisfy the size restriction (e.g., up to 8×8). In some examples, video encoder 20 may signal the size restriction, and video decoder 30 determines the size restriction from the signaling. In other words, the size restriction of 8×8 for when vertical or horizontal scans can be used is merely one example, and other sizes are possible, including sizes signaled by video encoder 20 to video decoder 30 or sizes for which video encoder 20 and video decoder 30 are pre-programmed.

The preceding example described harmonizing the techniques for determining the scan orders such that the same technique is used to determine scan order when RDPCM is applied for residual of intra-predicted block and when RDPCM is applied for residual of inter- or intra-BC predicted block. However, the techniques described in this disclosure are not so limited.

For instance, in the current HEVC specification, for lossy coding, but where quantization is still performed (e.g., transform-skip coding), video encoder 20 may apply transform-skip only to TUs of size 4×4. In some examples, video encoder 20 may be configured to apply residual DPCM to residual blocks generated from intra-prediction, inter-prediction, or intra-BC prediction only to residual blocks for which transform may be skipped in lossy case (e.g., restrict the application of residual DPCM to intra or inter blocks for which transform may be skipped in the lossy case). Because video decoder 30 performs generally the inverse of the process of video encoder 20, video decoder 30 may similarly be configured to apply residual DPCM to residual blocks generated from intra-prediction, inter-prediction, or intra-BC prediction only to residual blocks for which transform may be skipped in the lossy case (e.g., restrict the application of residual DPCM to intra or inter blocks for which transform may be skipped in the lossy case).

The restriction that RDPCM may only be applied to residual blocks for which transform may be skipped in the lossy case may also restrict the application of residual DPCM, by video encoder 20 or video decoder 30, in the lossless cases to those block sizes for which transform may be skipped in the lossy case. Currently transform may be skipped for 4×4 blocks; however, it may be possible to allow transform skip for other block sizes such as 8×8 (e.g., in future versions of HEVC).

In at least U.S. Provisional Application No. 61/815,148 or U.S. application Ser. Nos. 13/939,027 and 14/259,046, it was proposed to restrict the application of rotation of prediction residuals to block sizes for which the transform may be skipped in lossy coding mode. In other words, video encoder 20 and video decoder 30 may be configured to rotate prediction residuals only for block sizes for which the transform may be skipped in lossy coding mode. In some examples, video encoder 20 may signal information and video decoder 30 may receive information indicating block sizes for which the transform may be skipped in lossy coding mode in a slice header, picture parameter set (PPS), and/or sequence parameter set (SPS), as a few examples.

Combining these two concepts may result in the restriction that residual DPCM and rotation of prediction residuals may be applied only to block sizes for which the transform may be skipped in lossy coding mode. In other words, in some examples, video encoder 20 and video decoder 30 may be configured such that RDPCM and rotation of prediction residuals may be applied only to residual block sizes for which the transform is skipped in lossy coding mode.

In this manner, in some cases, there may be harmonization between the sizes for the transform-skip, rotation of prediction residuals, and the residual DPCM. Video encoder 20 may signal information and video decoder 30 may receive information indicating the size of the block for which transform-skip, rotation, or residual DPCM may be applied. In some cases, there may be harmonization between the sizes for the transform-skip, rotation of prediction residuals, and the residual DPCM. In these cases, because of the harmonization between the sizes of the transform-skip, rotation of prediction residuals, and the residual DPCM, video encoder 20 may signal information and video decoder 30 may receive information indicating the size for only one of transform-skip, rotation, or residual DPCM. In these examples, video decoder 30 may determine that the information indicating the size is applicable to all (e.g., the transform-skip, rotation, and residual DPCM, in this example) due to the harmonization, and video encoder 20 may not need to separately signal the size for when transform-skip, rotation, and residual DPCM are allowed to be applied.

As above, video encoder 20 may signal such information and video decoder 30 may receive such information in the slice header, PPS, and/or SPS. In some examples, video decoder 30 may be preconfigured with such information, and video encoder 20 need not necessarily signal such information. Such techniques directed to harmonization may be applicable to the examples described throughout this disclosure as well.

In some examples, a size restriction may be imposed on blocks to which residual DPCM may be applied. For instance, video encoder 20 may signal information indicating the size restrictions in the slice header, picture parameter set (PPS), and/or sequence parameter set (SPS), as a few examples. Video decoder 30 may determine the size restriction from the slice header, PPS, or SPS, as a few examples. In some instances, it may not be necessary for video encoder 20 to signal the information indicating the size restriction, and video decoder 30 may be pre-configured with such information. In the examples in which there is a size restriction, in some cases, video encoder 20 may signal such information for subsequent retrieval by video decoder 30, and in some cases, video decoder 30 may be preconfigured with such information, and video encoder 20 need not signal information indicating the size restriction.

For square blocks, residual DPCM may be applied only to block sizes up to a particular size (e.g. 8×8). For instance, video encoder 20 and video decoder 30 may be configured to apply residual DPCM only to block sizes of the residual block up to a particular size. In this example, video encoder 20 may signal information indicating the size to be 8×8, and video decoder 30 may determine that for residual blocks larger than 8×8, residual DPCM may not be applied. In some examples, video decoder 30 may be preconfigured with information indicating the residual block size for which residual DPCM can be applied, and video encoder 20 may not need to signal such information.

This size restriction may be set up independently for lossless and lossy modes, and may be signaled by video encoder 20 for subsequent retrieval by video decoder 30, or video decoder 30 may be preconfigured with the information indicating the size restriction for lossless and lossy modes. For example, for lossy mode, the size limit on residual DPCM may be (and in some examples, must be) less than or equal to the block size at which transform may be skipped for lossy coding. For lossless mode, the size limit may be (and in some examples, must be) greater than or equal to the smallest TU size.

In these examples, for lossy mode, video encoder 20 and video decoder 30 may not apply residual DPCM if the residual block size is greater than the block size at which transform may be skipped for lossy coding. Also, for lossless mode, video encoder 20 and video decoder 30 may not apply residual DPCM if the residual block size is smaller than the smallest TU.

For rectangular blocks, the size restriction may apply to the maximum of the width and height of the block or the minimum of the width and height of the block. For instance, video encoder 20 and video decoder 30 may be restricted (e.g., configured to avoid) residual DPCM for residual block sizes greater than the maximum width and/or height of the block or less than the width and height of the block. Video encoder 20 may signal such information, and video decoder 30 may subsequently retrieve such information.

Also, the RDPCM size restriction might be different for intra and inter predicted CU/frames. For example, for the intra case, video encoder 20 and video decoder 30 may not experience negative effects for a restriction to a maximum size of 8×8 (e.g., a restriction to a maximum size of 8×8 has almost no penalty in performance), while reducing the complexity, since the 16×16 and 32×32 RDPCM are removed. For the inter case, the limitation might be set to a larger size (e.g., 16×16), since for this case the performance penalty of the reduction might be larger.

In some examples, for intra coded blocks, in addition to the diagonal scan, horizontal and vertical scans may be used for block sizes up to 8×8. For example, if video encoder 20 and video decoder 30 are to intra-predict the current block, video encoder 20 and video decoder 30 may use horizontal or vertical scans on the coefficients of the residual block for residual block sizes up to 8×8. In this example, the transform-skip size, the block size up to which residual DPCM is applied, and the block size up to which the prediction residuals are rotated by 180 degrees (or by 90 or 270 degrees) may be required to be the same. For instance, there may be harmonization between the block sizes for residual blocks for which video encoder 20 and video decoder 30 may apply transform-skip, RDPCM, and rotation by 180, 90, and/or 270 degrees.

In some examples, in the case of applying RDPCM to inter blocks (e.g., applying RDPCM to a residual block generated from inter-prediction or intra-BC prediction), the order (direction) of RDPCM (e.g., horizontal or vertical RDPCM) may depend on the PU shape. For instance, if the PU has a horizontal rectangle-shape, where it is longer horizontally than vertically, video encoder 20 and video decoder 30 may determine that the PU uses vertical RDPCM. If the PU is a vertical rectangle-shape, where it is longer vertically than horizontally, video encoder 20 and video decoder 30 may determine that the PU uses horizontal RDPCM.

For a square PU, video encoder 20 and video decoder 30 may determine that no RDPCM is used. However, in some examples, a square PU may also use both RDPCM at the same time. For instance, video encoder 20 and video decoder 30 may apply a vertical RDPCM followed by horizontal RDPCM. Similar to example techniques described above, the scan order that video encoder 20 and video decoder 30 apply to the residual block may be based on the RDPCM direction (e.g., horizontal scan for vertical RDPCM, and vertical scan for horizontal RDPCM, or vice-versa as described in JCTVC-J0313.

Figure 2:
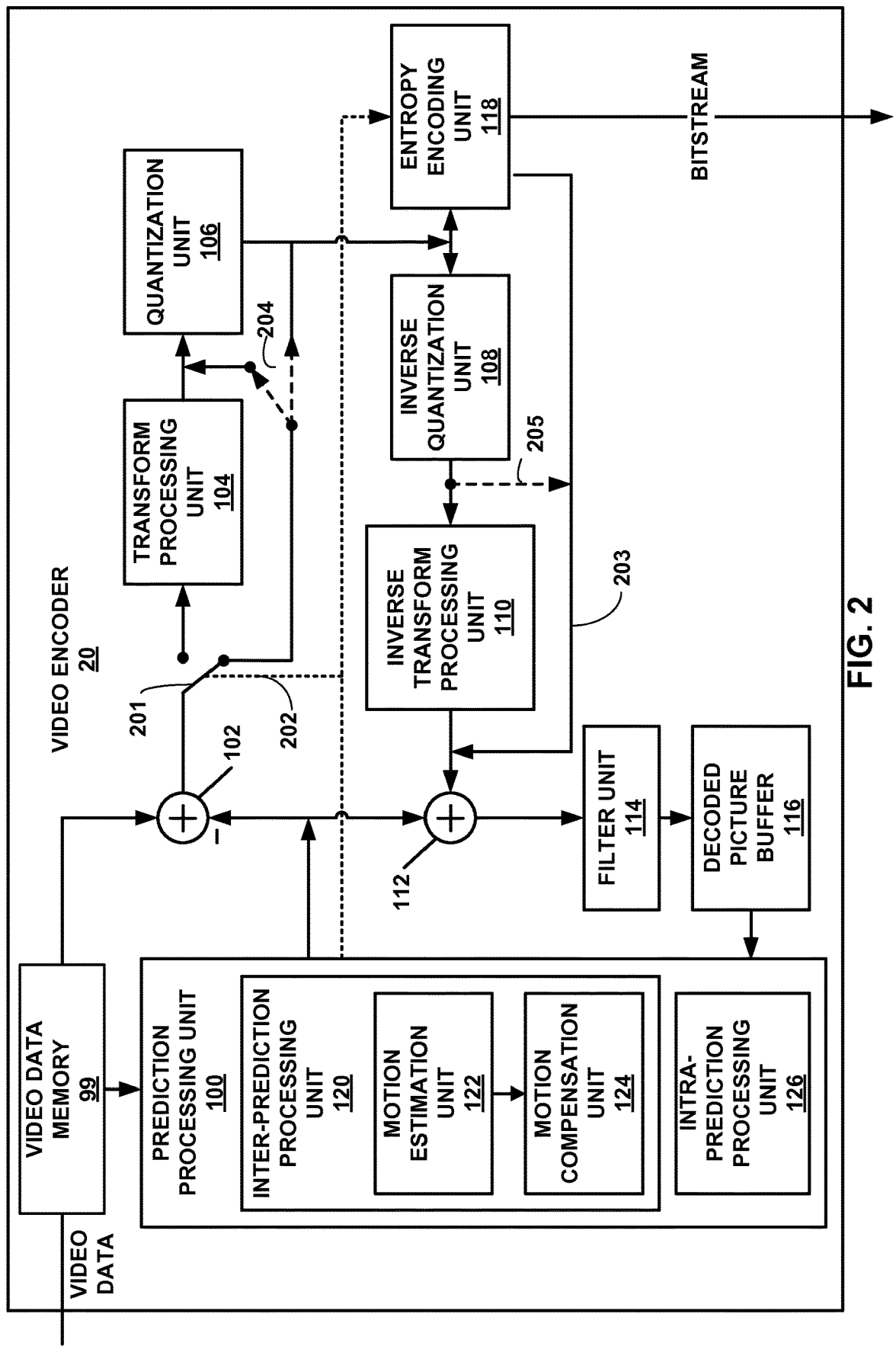
FIG. 2 is a block diagram illustrating an example video encoder that may implement the techniques of this disclosure.

FIG. 2 is a block diagram illustrating an example video encoder 20 that may implement the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding such as range extensions of the HEVC standard. However, the techniques of this disclosure may be applicable to other coding standards or methods.

As shown in FIG. 2, video data memory 99 receives video data that is used for encoding a current video block within a video picture. Video data memory 99 may store video data to be encoded by the components of video encoder 20 (e.g., configured to store video data) or store video data that is to be used for encoding video pictures. The video data stored in video data memory 99 may be obtained, for example, from video source 18. Decoding picture buffer 116 is one example of a decoding picture buffer (DPB) that stores reference video data for use in encoding video data by video encoder 20 (e.g., in intra-coding modes, inter-coding modes, intra-BC coding modes, also referred to as intra-prediction coding modes, inter-prediction coding modes, or intra-BC prediction coding modes). Video data memory 99 and DPB 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 99 and DPB 116 may be provided by the same memory device or separate memory devices. In various examples, video data memory 99 may be on-chip with other components of video encoder 20, or off-chip relative to those components.

In the example of FIG. 2, video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit 122 and a motion compensation unit 124. In other examples, video encoder 20 may include more, fewer, or different functional components. In some examples, inter-prediction processing unit 120 may also be configured to perform intra-BC prediction. In this case, motion estimation unit 122 and motion compensation unit 124 may not be estimating and compensating for motion, but instead estimating and compensating for minor changes in the picture for which intra-prediction may not function as well.

Video encoder 20 may receive video data. Video encoder 20 may encode each CTU in a slice of a picture of the video data. Each of the CTUs may be associated with equally-sized luma coding tree blocks (CTBs) and corresponding chroma CTBs of the picture. As part of encoding a CTU, prediction processing unit 100 may perform quad-tree partitioning to divide the CTBs of the CTU into progressively-smaller blocks. The smaller block may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with (i.e., correspond to) a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU, and perform similar functions but for intra-BC prediction. The predictive data for the PU may include predictive sample blocks of the PU and motion information for the PU or a block vector for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predicted block is formed using spatial prediction from previously-encoded neighboring blocks within the same frame.

If a PU is in a P slice, motion estimation unit 122 may search the reference pictures in a list of reference pictures (e.g., "RefPicList0") for a reference region for the PU. The reference region for the PU may be a region, within a reference picture, that contains sample blocks that most closely corresponds to the sample blocks of the PU. Motion estimation unit 122 may generate a reference index that indicates a position in RefPicList0 of the reference picture containing the reference region for the PU. In addition, motion estimation unit 122 may generate an MV that indicates a spatial displacement between a coding block of the PU and a reference location associated with the reference region. For instance, the MV may be a two-dimensional vector that provides an offset from the coordinates in the current decoded picture to coordinates in a reference picture. Motion estimation unit 122 may output the reference index and the MV as the motion information of the PU. Motion compensation unit 124 may generate the predictive sample blocks of the PU based on actual or interpolated samples at the reference location indicated by the motion vector of the PU.

If a PU is in a B slice, motion estimation unit 122 may perform uni-prediction or bi-prediction for the PU. To perform uni-prediction for the PU, motion estimation unit 122 may search the reference pictures of RefPicList0 or a second reference picture list ("RefPicList1") for a reference region for the PU. Motion estimation unit 122 may output, as the motion information of the PU, a reference index that indicates a position in RefPicList0 or RefPicList1 of the reference picture that contains the reference region, an MV that indicates a spatial displacement between a sample block of the PU and a reference location associated with the reference region, and one or more prediction direction indicators that indicate whether the reference picture is in RefPicList0 or RefPicList1. Motion compensation unit 124 may generate the predictive sample blocks of the PU based at least in part on actual or interpolated samples at the reference region indicated by the motion vector of the PU.

To perform bi-directional inter prediction for a PU, motion estimation unit 122 may search the reference pictures in RefPicList0 for a reference region for the PU and may also search the reference pictures in RefPicList1 for another reference region for the PU. Motion estimation unit 122 may generate reference picture indexes that indicate positions in RefPicList0 and RefPicList1 of the reference pictures that contain the reference regions. In addition, motion estimation unit 122 may generate MVs that indicate spatial displacements between the reference location associated with the reference regions and a sample block of the PU. The motion information of the PU may include the reference indexes and the MVs of the PU. Motion compensation unit 124 may generate the predictive sample blocks of the PU based at least in part on actual or interpolated samples at the reference region indicated by the motion vector of the PU.

In accordance with one or more techniques of this disclosure, one or more units within prediction processing unit 100 may perform one or more of the techniques described herein as part of a video encoding process. However, the techniques described in this disclosure are not so limited. In some examples, prediction processing unit 100 in combination with one or more other units may perform one or more of the techniques described in this disclosure. In some examples, a processor (not shown) either alone or in combination with one or more units of video encoder 20 may implement the example techniques described in this disclosure. For instance, video encoder 20 may be considered as comprising one or more processors, and these one or more processors may be configured to implement the example techniques described in this disclosure.

Intra-prediction processing unit 126 may generate predictive data for a PU by performing intra prediction on the PU. The predictive data for the PU may include predictive sample blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. In some intra prediction modes, intra-prediction processing unit 126 may extend samples from sample blocks of neighboring PUs across the sample blocks of the PU in a direction associated with the intra prediction mode. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region (e.g., prediction block) associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive sample blocks of the selected predictive data may be referred to herein as the selected predictive sample blocks.

Residual generation unit 102 may generate a residual block based coding block of a CU and selected predictive PU (e.g., generate, based on the luma, Cb and Cr coding block of a CU and the selected predictive luma, Cb and Cr blocks of the PUs of the CU, a luma, Cb and Cr residual blocks of the CU). For instance, residual generation unit 102 may generate the residual blocks of the CU such that each sample in the residual blocks has a value equal to a difference between a sample in a coding block of the CU and a corresponding sample in a corresponding selected predictive sample block of a PU of the CU.

Transform processing unit 104 may perform quad-tree partitioning to partition the residual blocks of (i.e., associated with) a CU into transform blocks associated with TUs of the CU. Thus, a TU may correspond to (i.e., be associated with) a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU to convert the residual values of the residual data of the residual block (e.g., TU) from a pixel domain to a transform domain. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive sample blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform any of a variety of filtering operations including one or more deblocking operations to reduce blocking artifacts in the coding blocks associated with a CU, sample adaptive offset (SAO), or adaptive loop filtering (ALF). Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data.

In some examples, when RDPCM is applied, entropy encoding unit 118 may perform the RDPCM. For example, prediction processing unit 100 may instruct entropy encoding unit 118 to apply RDPCM and define the order of the RDPCM (e.g., horizontal or vertical RDPCM) to be applied on the residual block. In some examples, a component of video encoder 20 not illustrated in FIG. 2 may perform the RDPCM. As described above, RDPCM is applied to a residual block, which may be the output of residual generation unit 102, transform processing unit 104, or quantization unit 106.

In some examples, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

Element 201 may represent a switch (or a conceptual switch) for implementing transform skipping. Control signal 202 may represent a signal from prediction processing unit 100 that determines if a transform skip mode is to be implemented, and element 203 may represent a decoding loop that bypasses the inverse transform and inverse quantization processes. In some examples, lossless coding eliminates transforms and quantization. In other examples, lossless coding performs transforms and eliminates only the quantization process. In still other examples, lossless coding may be implemented with the use of transforms and quantitation, but the quantization parameter may be selected so as to avoid any quantization data loss. These and other examples are within the scope of this disclosure.

Elements 204 and 205 represent switches (or conceptual switches) that may be used to implement a transform skipping mode. In transform skipping modes, the residual data is not transformed by transform processing unit 104 but is quantized by quantization unit 106. Thus, the dashed lines of element 204 represent two possible data paths. In one data, the residual data is quantized by quantization unit 106 and in the other data path the residual data is not quantized by quantization unit 106. Similarly, in the decoding loop of video encoder 20, the residual data is inverse quantized by inverse quantization unit 108 but is not transformed by inverse transform processing unit 110. Thus, the dashed lines of element 205 represent an alternate data path where the residual data is inverse quantized by inverse quantization unit 108 but is not transformed by inverse transform processing unit 110.

In accordance with the techniques described in this disclosure, video data memory 99 may be configured to store a predictive block for a current block. Video encoder 20 may be configured to determine a direction in which residual differential pulse code modulation (RDPCM) is to be applied to a first residual block, if RDPCM is applied to the first residual block. This first residual block includes residual data generated from a difference between the predictive block, referred to by a vector of the current block, and the current block. As described above, a residual block refers to the block to be entropy encoded, and may correspond to a TU. For example, a difference between the current block and the predictive block may result in a block that is further divided into a plurality of TUs or not further divided (e.g., kept as a single TU). A residual block is the single TU, where there is not further division, or one of the TUs, where there is further division.

Video encoder 20 may also be configured to determine a scan order for the first residual block based on the determined direction in which the residual DPCM is applied. Again, the first residual block is generated from inter-prediction or intra-BC prediction of the current block, and for which transform may be skipped or bypassed. Examples of the direction in which residual DPCM is applied include a vertical residual DPCM and a horizontal residual DPCM. If video encoder 20 determined that the residual DPCM for the first residual block is a vertical residual DPCM and if the size of the first residual block is less than or equal to 8×8 (as one example of a threshold size), video encoder 20 may determine a horizontal scan for the residual block (e.g., for each 4×4 sub-blocks). If video encoder 20 determined that the residual DPCM for the first residual block is a horizontal residual DPCM and if the size of the first residual block is less than or equal to 8×8 (as one example of a threshold size), video encoder 20 may determine a vertical scan for the residual block (e.g., for each 4×4 sub-blocks).

In some examples, for vertical or horizontal scan, the determined direction may be required to be the same scan order as would be used on a second residual block if the second residual block was generated from intra-predicting the current block and if the second residual block had residual DPCM applied with the same direction as the determined direction in which the residual DPCM is applied to the first residual block. For instance, in some examples, a scan order used for such a residual block may be required to be the same as when the residual block is generated from intra-predicting the current block and when the residual block is generated from inter-predicting or intra block copy predicting the current block. It should be understood that the harmonization of the scan orders for inter-prediction, intra-BC prediction, and intra-prediction where RDPCM is applied for sizes less than or equal to 8×8 is described to ease with understanding, and the selection of scan order for residual block generated is not required to be harmonized between inter-prediction, intra-BC prediction, and intra-prediction.

In some examples, the determined scan order for the first residual block may be required to be the same scan order as would be used on the second residual block if the first residual block had a size up to 8×8 (e.g., the TU size of the TU is less than or equal to 8×8). For instance, for application of a horizontal RDPCM, if the second residual block would have been vertically scanned, then video encoder 20 may determine the scan order for the first residual block to be a vertical scan. For application of a vertical RDPCM, if the second residual block would have been horizontally scanned, then video encoder 20 may determine the scan order for the first residual block to be a horizontal scan. As another example, for application of a horizontal RDPCM, if the second residual block would have been horizontally scanned, then video encoder 20 may determine the scan order for the first residual block to be a horizontal scan. For application of a vertical RDPCM, if the second residual block would have been vertically scanned, then video encoder 20 may determine the scan order for the first residual block to be a vertical scan.

Video encoder 20 may entropy encode the residual data of the first residual block based on the determined scan order, and may encode information indicating the determined direction in which residual DPCM is applied. Video encoder 20 may output the encoded residual data and the information indicating the determined direction in which residual DPCM is applied.

Figure 3:
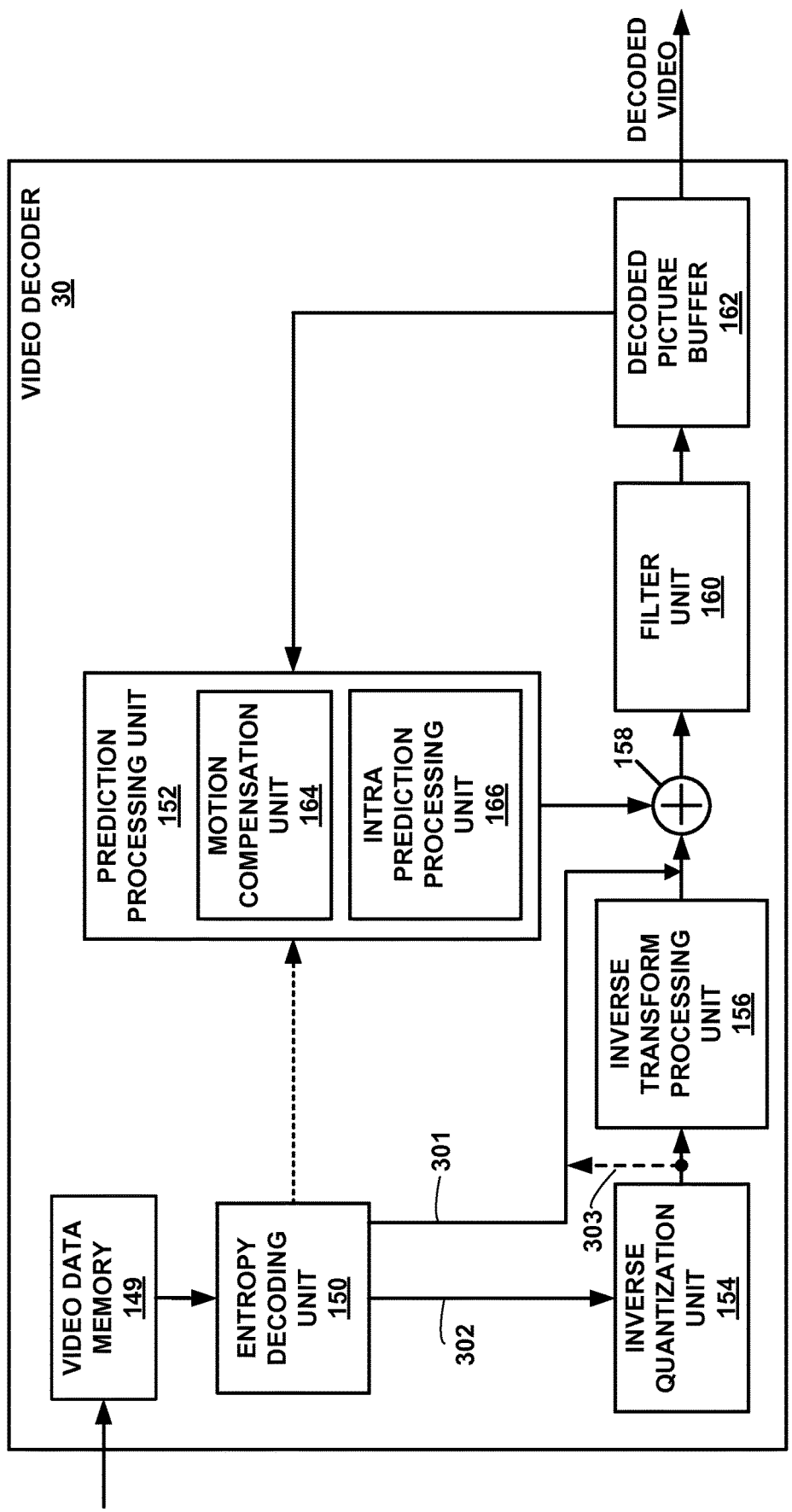
FIG. 3 is a block diagram illustrating an example video decoder that may implement the techniques of this disclosure.

FIG. 3 is a block diagram illustrating an example video decoder 30 that is configured to implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding standard such as the range extensions of the HEVC coding standard. However, the techniques of this disclosure may be applicable to other coding standards or methods.

In the example of FIG. 3, video data memory 149 receives encoded video. Video data memory 149 may store video data (e.g., configured to store video data), such as an encoded video bitstream, to be decoded by the components of video decoder 30. The video data stored in video data memory 149 may be obtained from a local video source, such as a camera, via wired or wireless network communication of video data, or by accessing physical data storage media. Video data memory 149 may form a coded picture buffer (CPB) that stores encoded video data from an encoded video bitstream.

Decoded picture buffer 162 is one example of a decoded picture buffer (DPB) that stores reference video data for use in decoding video data by video decoder 30 (e.g., in intra-coding mode, inter-coding mode, and intra-BC coding mode). Video data memory 149 and DPB 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 149 and DPB 162 may be provided by the same memory device or separate memory devices. In various examples, video data memory 149 may be on-chip with other components of video decoder 30, or off-chip relative to those components.

In the example of FIG. 3, video decoder 30 includes an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components. In some examples, motion compensation unit 164 or intra prediction processing unit 166 may be further configured to also perform intra-BC prediction processing.

Video decoder 30 may receive a bitstream. Entropy decoding unit 150 may parse the bitstream to decode syntax elements from the bitstream. Entropy decoding unit 150 may entropy decode entropy-encoded syntax elements in the bitstream. Prediction processing unit 152, inverse quantization unit 154, inverse transform processing unit 156, reconstruction unit 158, and filter unit 160 may generate decoded video data based on the syntax elements extracted (e.g., obtained) from the bitstream.

In some examples, entropy decoding unit 150 may be configured to perform the RDPCM to reconstruct the residual block, where the residual block has been encoded with transform-skip, lossy, or lossless. In some examples, a component other than entropy decoding unit 150 may be configured to implement RDPCM to reconstruct the residual block.

The bitstream may comprise a series of network abstraction layer (NAL) units. The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In addition to decoding syntax elements from the bitstream, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive blocks (e.g., luma, Cb and Cr predictive blocks) for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may extract (e.g., determine) motion information for the PU. Motion compensation unit 164 may determine, based on the motion information of the PU, one or more reference regions for the PU. Motion compensation unit 164 may generate, based on samples blocks at the one or more reference regions for the PU, predictive blocks (e.g., luma, Cb and Cr predictive blocks) for the PU.

In accordance with one or more techniques of this disclosure, one or more units within prediction processing unit 152 may perform techniques described herein as part of a video decoding process. However, the techniques described in this disclosure are not so limited. In some examples, prediction processing unit 152 in combination with one or more other units may perform one or more of the techniques described in this disclosure. In some examples, a processor (not shown) either alone or in combination with one or more units of video decoder 30 may implement the example techniques described in this disclosure. For example, video decoder 30 may include one or more processors configured to implement the example techniques described in this disclosure.

Reconstruction unit 158 may use the transform blocks (e.g., luma, Cb and Cr transform blocks) associated with TUs of a CU and the predictive blocks (e.g., luma, Cb and Cr predictive blocks) of the PUs of the CU (i.e., either intra-prediction data or inter-prediction data, as applicable) to reconstruct the coding blocks (e.g., luma, Cb and Cr coding blocks) of the CU. For example, reconstruction unit 158 may add samples of the luma, Cb and Cr transform blocks to corresponding samples of the predictive luma, Cb and Cr blocks to reconstruct the luma, Cb and Cr coding blocks of the CU.

Filter unit 160 may perform a variety of filtering operations including a deblocking operation to reduce blocking artifacts associated with the coding blocks (e.g., luma, Cb and Cr coding blocks) of the CU, SAO, or ALF. Video decoder 30 may store the coding blocks (e.g., luma, Cb and Cr coding blocks) of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma, Cb and Cr blocks in decoded picture buffer 162, intra prediction or inter prediction operations on PUs of other CUs. In this way, video decoder 30 may extract (e.g., obtain), from the bitstream, transform coefficient levels of a coefficient block, inverse quantize the transform coefficient levels, apply a transform to the transform coefficient levels to generate a transform block, generate, based at least in part on the transform block, a coding block, and output the coding block for display.

Element 302 may represent a normal coding path, and element 301 may represent a bypass coding path that bypasses the inverse transform and inverse quantization processes. These different paths are merely exemplary and lossless coding may be performed without any bypass. In some examples, lossless coding eliminates transforms and quantization. In other examples, lossless coding performs transforms and eliminates only the quantization process. In still other examples, lossless coding may be implemented with the use of transforms and quantitation, but the quantization parameter may be selected so as to avoid any quantization data loss. These and other examples are within the scope of this disclosure. Element 303 represents an example of a path that may be used for a transform skipping mode. In a transform skipping mode, the residual data may be inverse quantized by inverse quantization unit 154, but the inverse transforming of inverse transform processing unit 156 may be skipped.

In some examples, video data memory 149 may be configured to store a first residual block that includes residual data generated from a difference between a predictive block, referred to by a vector of a current block, and the current block. Video decoder 30 may be configured to decode information indicating a direction in which residual differential pulse code modulation (DPCM) is applied to the first residual block if residual DPCM is applied to the residual block. As described above, a residual block refers to the block to be entropy encoded, and may correspond to a TU. For example, a difference between the current block and predictive block may result in a block that is further divided into a plurality of TUs or not further divided (e.g., kept as a single TU). A residual block is the single TU, where there is not further division, or one of the TUs, where there is further division.

Video decoder 30 may be configured to determine a scan order for the first residual block based on the information indicating the direction. Again, the first residual block is generated from inter-prediction or intra-BC prediction of the current block, and for which transform may be skipped or bypassed. Examples of the direction in which residual DPCM is applied include a vertical residual DPCM and a horizontal residual DPCM. If video decoder 30 decoded information indicating that the residual DPCM for the first residual block is a vertical residual DPCM and if the size of the first residual block is less than or equal to 8×8 (as one example of a threshold size), video decoder 30 may determine a horizontal scan for the residual block (e.g., for each 4×4 sub-blocks). If video decoder 30 determined that the residual DPCM for the first residual block is a horizontal residual DPCM and if the size of the first residual block is less than or equal to 8×8 (as one example of a threshold size), video decoder 30 may determine a vertical scan for the residual block (e.g., for each 4×4 sub-blocks).

In some examples, the determined scan order may be required to be the same scan order as would be used on a second residual block if the second residual block was generated from intra-predicting the current block and if the second residual block had residual DPCM applied with the same direction as the direction indicated in the decoded information. For instance, in some examples, a scan order used for such a residual block may be required to be the same as when the residual block is generated from intra-predicting the current block and when the residual block is generated from inter-predicting or intra block copy predicting the current block.

In some examples, for vertical or horizontal scan, the determined scan order for the first residual block may be required to be the same scan order as would be used on the second residual block if the first residual block had a size up to 8×8 (e.g., the TU size of the TU is less than or equal to 8×8). For instance, for application of a horizontal RDPCM, if the second residual block would have been vertically scanned, then video decoder 30 may determine the scan order for the first residual block to be a vertical scan. For application of a vertical RDPCM, if the second residual block would have been horizontally scanned, then video decoder 30 may determine the scan order for the first residual block to be a horizontal scan. As another example, for application of a horizontal RDPCM, if the second residual block would have been horizontally scanned, then video decoder 30 may determine the scan order for the first residual block to be a horizontal scan. For application of a vertical RDPCM, if the second residual block would have been vertically scanned, then video decoder 30 may determine the scan order for the first residual block to be a vertical scan.

Video decoder 30 may entropy decode the residual data of the first residual block based on the determined scan order. Video decoder 30 may reconstruct (e.g., inter-decode) the current block based on the decoded residual data.

Figure 5:
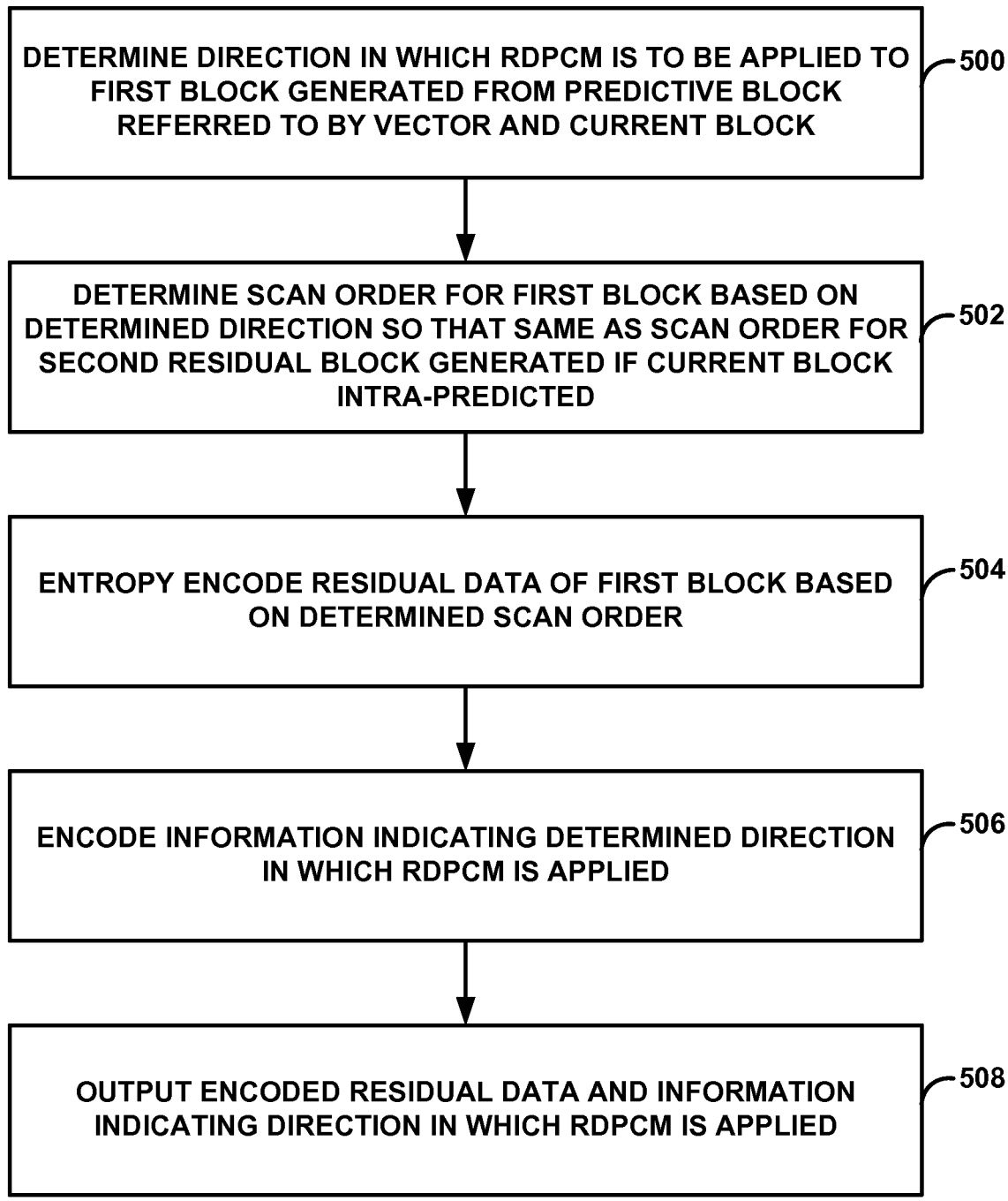
FIG. 5 is a flowchart illustrating an example technique of encoding video data in accordance with this disclosure.

FIG. 5 is a flowchart illustrating an example technique of encoding video data in accordance with this disclosure. In the example illustrated in FIG. 5, if residual differential pulse code modulation (DPCM) is to be applied, video encoder 20 may determine a direction in which residual DPCM is to be applied to a first residual block that includes residual data generated from a difference between a predictive block, referred to by a vector of a current block, and the current block (500).

Examples of the direction in which residual DPCM is applied include horizontal residual DPCM and vertical residual DPCM. As one example, the vector of the current block may be a motion vector, and the first residual block may be generated from inter-prediction of the current block. As another example, the vector of the current block may be a block vector, and the first residual block may be generated from intra block copy prediction of the current block.

Video encoder 20 may determine a scan order for the first residual block based on the determined direction in which the residual DPCM is applied (502). In some examples, the size of the first residual block may also factor into the determination of the scan order (e.g., horizontal or vertical scans may be only be available for TU sizes of 8×8 or less). As one example, if video encoder 20 determined the direction of the residual DPCM to be a vertical residual DPCM and if the size of the first residual block was less than or equal to a threshold size (e.g., 8×8), video encoder 20 may determine the scan order to be horizontal scan. If video encoder 20 determined the direction of the residual DPCM to be a horizontal residual DPCM and if the size of the first residual block was less than or equal to a threshold size (e.g., 8×8), video encoder 20 may determine the scan order to be vertical scan. In some examples, for a horizontal residual DPCM, a horizontal scan may be used, and for a vertical residual DPCM, a vertical scan may be used.

In some examples, the determined scan order may be required to be the same scan order as would be used on a second residual block if the second residual block was generated from intra-predicting the current block and if the second residual block had residual DPCM applied with the same direction as the determined direction in which the residual DPCM is applied to the first residual block. As one example, if video encoder 20 determined that a horizontal residual DPCM is to be applied, then video encoder 20 may determine the scan order for the first residual block to be a vertical scan, if the size of the first residual block was less than or equal to 8×8 and if the second residual block, that would be generated from intra-predicting the current block, had horizontal residual DPCM applied and would have used the vertical scan. If video encoder 20 determined that a vertical residual DPCM is to be applied, then video encoder 20 may determine the scan order for the first residual block to be a horizontal scan, if the size of the first residual block was less than or equal to 8×8 and if the second residual block had vertical residual DPCM applied and would have used the horizontal scan.

As another example, if video encoder 20 determined that a horizontal residual DPCM is to be applied, then video encoder 20 may determine the scan order for the first residual block to be a horizontal scan, if the size of the first residual block was less than or equal to 8×8 and if the second residual block had horizontal residual DPCM applied and would have used the horizontal scan. If video encoder 20 determined that a vertical residual DPCM is to be applied, then video encoder 20 may determine the scan order for the first residual block to be a vertical scan, if the first residual block was less than or equal to 8×8 and if the second residual block had vertical residual DPCM applied and would have used the vertical scan.

In this way, in some examples, video encoder 20 may determine the size of the residual block (e.g., TU). Video encoder 20 may determine the scan order based on the direction of the residual DPCM and the determined size of the residual block. For instance, if the size of the residual block is less than or equal to a threshold size (e.g., 8×8), then video encoder 20 may determine that the scan order is one of horizontal or vertical scans based on the direction of the residual DPCM. If the size of the residual block is greater than the threshold size (e.g., 8×8), then video encoder 20 may utilize diagonal scan. The 8×8 block size is one example, and other sizes are possible.

Video encoder 20 may entropy encode the residual data of the first residual block based on the determined scan order (504). Video encoder 20 may encode (e.g., entropy encode or otherwise) information indicating the determined direction in which residual DPCM is applied (506). Video encoder 20 may output the encoded residual data and the information indicating the determined direction in which residual DPCM is applied, which video decoder 30 may utilize to reconstruct (e.g., decode) the current block (508).

Figure 6:
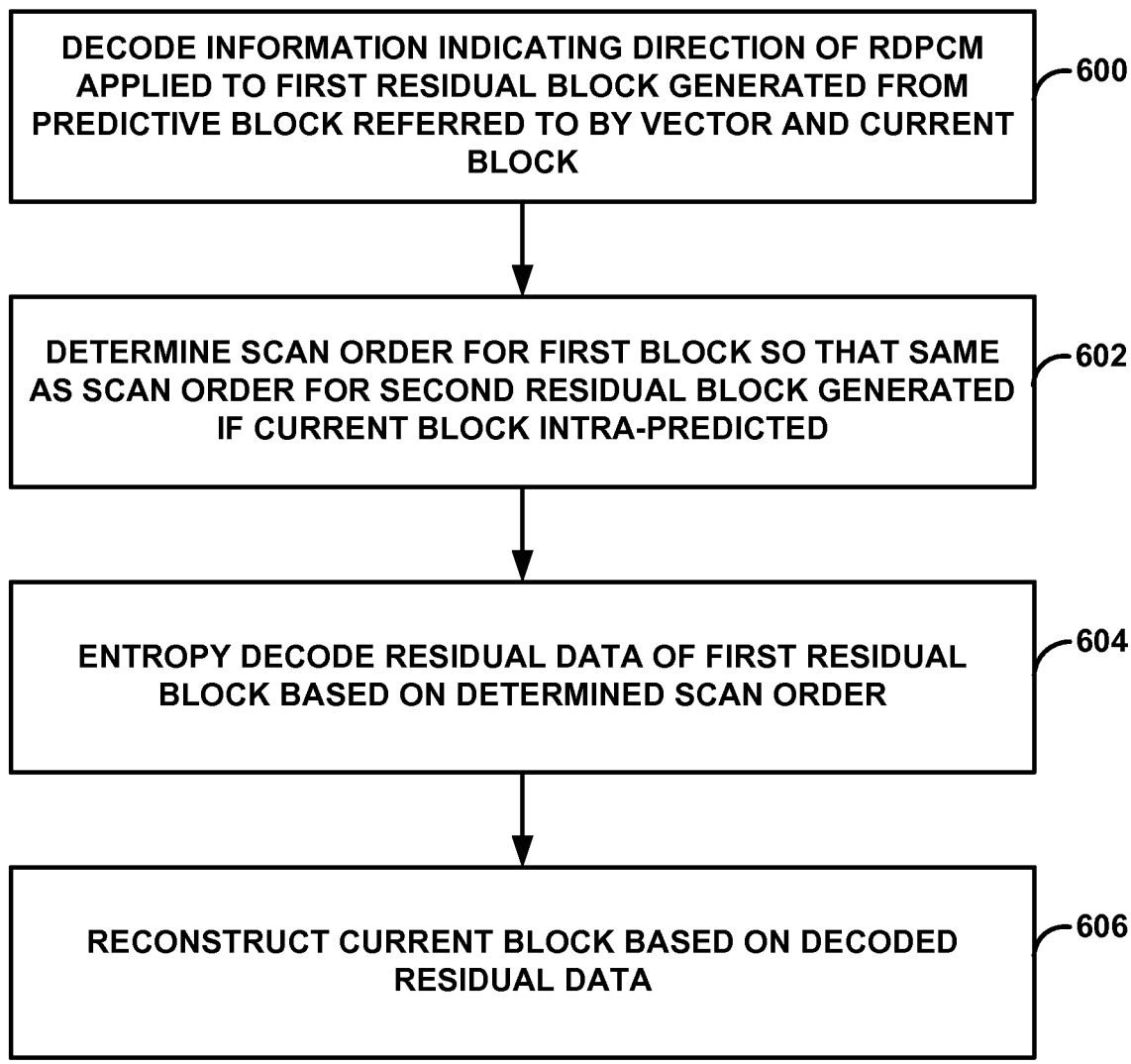
FIG. 6 is a flowchart illustrating an example technique of decoding video data in accordance with this disclosure.

FIG. 6 is a flowchart illustrating an example technique of decoding video data in accordance with this disclosure. In the example of FIG. 6, video decoder 30 may decode information indicating a direction in which residual differential pulse code modulation (DPCM) is applied to a first residual block that includes residual data generated from a difference between a predictive block, referred to by a vector of a current block, and the current block (600). In some examples, residual DPCM may only be applied when transform is skipped or bypassed for the residual block.

Examples of the direction in which residual DPCM is applied include horizontal residual DPCM and vertical residual DPCM. As one example, the vector of the current block may be a motion vector, and the first residual block may be generated from inter-prediction of the current block. As another example, the vector of the current block may be a block vector, and the first residual block may be generated from intra block copy prediction of the current block.

Video decoder 30 may determine a scan order for the first residual block based on the information indicating the direction (602). In some examples, the size of the first residual block may also factor into the determination of the scan order (e.g., horizontal or vertical scans may be only be available for TU sizes of 8×8 or less). As one example, if video decoder 30 determined the direction of the residual DPCM to be a vertical residual DPCM and if the size of the first residual block was less than or equal to a threshold size (e.g., 8×8), video decoder 30 may determine the scan order to be horizontal scan. If video decoder 30 determined the direction of the residual DPCM to be a horizontal residual DPCM and if the size of the first residual block was less than or equal to a threshold size (e.g., 8×8), video decoder 30 may determine the scan order to be vertical scan. In some examples, for a horizontal residual DPCM, a horizontal scan may be used, and for a vertical residual DPCM, a vertical scan may be used.

In some examples, the determined scan order may be required to be the same scan order as would be used on a second residual block if the second residual block was generated from intra-predicting the current block and if the second residual block had residual DPCM applied with the same direction as the direction indicated in the decoded information. As one example, if video decoder 30 decoded information indicating that a horizontal residual DPCM is to be applied, then video decoder 30 may determine the scan order for the first residual block to be a vertical scan, if the size of the first residual block was less than or equal to 8×8 and if the second residual block had horizontal residual DPCM applied and would have used the vertical scan. If video decoder 30 decoded information indicating that a vertical residual DPCM is to be applied, then video decoder 30 may determine the scan order for the first residual block to be a horizontal scan, if the size of the residual block was less than or equal to 8×8 and if the second residual block had vertical residual DPCM applied and would have used the horizontal scan.

As described above, the second residual block is a block that would be generated from intra-predicting the current block, where the RDPCM direction equals the intra-prediction mode. For instance, vertical RDPCM means vertical mode for intra-prediction, and horizontal RDPCM means horizontal mode for intra-prediction. In this example, the scan order is orthogonal to the RDPCM direction and intra-prediction mode. However, such orthogonality is not required in every example.

As another example, if video decoder 30 decoded information indicating that a horizontal residual DPCM is to be applied, then video decoder 30 may determine the scan order for the first residual block to be a horizontal scan, if the size of the first residual block was less than or equal to 8×8 and if the second residual block had horizontal residual DPCM applied and would have used the horizontal scan. If video decoder 30 decoded information indicating that a vertical residual DPCM is to be applied, then video decoder 30 may determine the scan order for the first residual block to be a vertical scan, if the size of the residual block was less than or equal to 8×8 and if the second residual block had vertical residual DPCM applied and would have used the vertical scan.

In this way, in some examples, video decoder 30 may determine the size of the residual block (e.g., TU). Video decoder 30 may determine the scan order based on the direction of the residual DPCM and the determined size of the residual block. For instance, if the size of the residual block is less than or equal to a threshold size (e.g., 8×8), then video decoder 30 may determine that the scan order is one of horizontal or vertical scans based on the direction of the residual DPCM. If the size of the residual block is greater than the threshold size (e.g., 8×8), then video decoder 30 may utilize diagonal scan. The 8×8 block size is one example, and other sizes are possible.

Video decoder 30 may entropy decode the residual data of the first residual block based on the determined scan order (604). For example, entropy decoding the residual data may include entropy decoding 4×4 sub-blocks of the first residual block based on the determined scan order.

Video decoder 30 may reconstruct (e.g., decode) the current block based on the decoded residual data (606). For example, if the vector for the current block is a motion vector that refers to the predictive block in a picture other than the picture that includes the current block, video decoder 30 may inter-prediction decode the current block. If the vector for the current block is a block vector that refers to the predictive block in the same picture as the picture that includes the current block, video decoder 30 may intra block copy (intra-BC) prediction decode the current block.

In one or more examples, the functions described herein may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   decoding information indicating a direction in which residual differential pulse code modulation (DPCM) is applied to a first residual block that includes residual data generated from a difference between a predictive block, referred to by a vector of a current block, and the current block, wherein the information indicating the direction comprises information indicating one of a vertical residual DPCM or a horizontal residual DPCM;
   determining a scan order for the first residual block based on the information indicating the direction, wherein determining the scan order for the first residual block comprises determining only one of:
      a vertical scan based on the horizontal residual DPCM being applied to the first residual block and the size of the first residual block being less than or equal to 8×8, or
      a horizontal scan based on the vertical residual DPCM being applied to the first residual block and the size of the first residual block being less than or equal to 8×8;
   entropy decoding the residual data of the first residual block based on the determined scan order; and
   reconstructing the current block based on the decoded residual data.

2. The method of claim 1, wherein the vector of the current block comprises a motion vector, wherein the first residual block is generated from inter-prediction of the current block, and wherein, in inter-prediction of the current block, the predictive block is in a different picture than the current block.

3. The method of claim 1, wherein the vector of the current block comprises a block vector, wherein the first residual block is generated from intra block copy prediction of the current block, and wherein, in intra block copy prediction of the current block, the predictive block is in the same picture as the current block.

4. The method of claim 1, wherein the residual data generated from the difference between the predictive block, referred to by the vector of the current block, and the current block comprises residual data that includes residual values from the difference between the predictive block and the current block without a transform applied to the residual values that converts the residual values from a pixel domain to a transform domain.

5. The method of claim 1, wherein entropy decoding the residual data comprises entropy decoding 4×4 sub-blocks of the first residual block based on the determined scan order.

6. The method of claim 1, further comprising:
   decoding information indicating whether residual DPCM is applied to the first residual block; and
   determining whether residual DPCM is applied to the first residual block based on the decoded information indicating whether residual DPCM is applied to the first residual block,
   wherein decoding information indicating the order in which residual DPCM is applied comprises decoding information indicating the order in which residual DPCM is applied based on the determination that residual DPCM is applied to the first residual block.

7. The method of claim 6, further comprising:
   based on the determination that residual DPCM is not applied to the first residual block, determining that the scan order is a diagonal scan.

8. A method of encoding video data, the method comprising:
   determining a first direction in which residual differential pulse code modulation (DPCM) is to be applied to a first residual block that includes first residual data generated from intra-prediction of a first block;
   determining a first scan order for the first residual block based on the determined first direction in which the residual DPCM is applied;
   determining a second direction in which residual DPCM is to be applied to a second residual block that includes second residual data generated from a difference between a predictive block, referred to by a vector of a current block, and the current block, wherein the current block is a same size as the first block, and wherein the first direction and the second direction are the same;
   determining a second scan order for the second residual block, and no other scan order for the second residual block, based on the determined second direction in which the residual DPCM is applied, wherein the determined second scan order is required to be the same scan order as the determined first scan order based on the first direction in which residual DPCM is applied and the second direction in which residual DPCM is applied being the same;
   entropy encoding the second residual data of the second residual block based on the determined second scan order;
   encoding information indicating the determined second direction in which residual DPCM is applied; and
   outputting the encoded second residual data and the information indicating the determined second direction in which residual DPCM is applied.

9. The method of claim 8, wherein the vector of the current block comprises a motion vector, wherein the second residual block is generated from inter-prediction of the current block, and wherein, in inter-prediction of the current block, the predictive block is in a different picture than the current block.

10. The method of claim 8, wherein the vector of the current block comprises a block vector, wherein the second residual block is generated from intra block copy prediction of the current block, and wherein, in intra block copy prediction of the current block, the predictive block is in the same picture as the current block.

11. The method of claim 8,
   wherein determining the second direction comprises one of determining that a horizontal residual DPCM is to be applied or a vertical residual DPCM is to be applied, and
   wherein determining the second scan order for the second residual block comprises one of:
      determining a vertical scan based on the first residual block having horizontal residual DPCM applied with the vertical scan, or
      determining a horizontal scan based on the first residual block having vertical residual DPCM applied with the horizontal scan.

12. The method of claim 8, further comprising:
   determining whether a size of the second residual block is less than or equal to a threshold size, wherein determining the second direction comprises one of determining that a horizontal residual DPCM is to be applied or a vertical residual DPCM is to be applied, and wherein determining the second scan order for the first residual block comprises one of:
  determining a vertical scan based on the size of the second residual block being less than or equal to the threshold size, and the first residual block having horizontal residual DPCM applied with the vertical scan, or
  determining a horizontal scan based on the size of the second residual block being less than or equal to the threshold size, and the first residual block having vertical residual DPCM applied with the horizontal scan.

13. The method of claim 12, wherein the threshold size is 8×8.

14. The method of claim 8,
wherein determining the second direction comprises one of determining that a horizontal residual DPCM is to be applied or a vertical residual DPCM is to be applied, and
wherein determining the scan order for the second residual block comprises one of:
  determining a horizontal scan based on the first residual block having horizontal residual DPCM applied with the horizontal scan, or
  determining a vertical scan based on the first residual block having vertical residual DPCM applied with the vertical scan.

15. The method of claim 8, further comprising:
determining whether a size of the second residual block is less than or equal to a threshold size,
wherein determining the second direction comprises one of determining that a horizontal residual DPCM is to be applied or a vertical residual DPCM is to be applied, and
wherein determining the second scan order for the second residual block comprises one of:
  determining a horizontal scan based on the size of the second residual block being less than or equal to the threshold size, and the first residual block having horizontal residual DPCM applied with the horizontal scan, or
  determining a vertical scan based on the size of the second residual block being less than or equal to the threshold size, and the first residual block having vertical residual DPCM applied with the vertical scan.

16. A device for decoding video data, the device comprising:
a video data memory configured to store a first residual block that includes residual data generated from a difference between a predictive block, referred to by a vector of a current block, and the current block; and
a video decoder comprising at least one of fixed-function or programmable circuitry, wherein the video decoder is configured to:
  decode information indicating a direction in which residual differential pulse code modulation (DPCM) is applied to the first residual block, wherein the information indicating the direction comprises information indicating one of a vertical residual DPCM or a horizontal residual DPCM;
  determine a scan order for the first residual block based on the information indicating the direction, wherein to determine the scan order the video decoder is configured to determine only one of:
    a vertical scan based on the horizontal residual DPCM being applied to the first residual block and the size of the first residual block being less than or equal to 8×8, or
    a horizontal scan based on the vertical residual DPCM being applied to the first residual block and the size of the first residual block being less than or equal to 8×8;
  entropy decode the residual data of the first residual block based on the determined scan order; and
  reconstruct the current block based on the decoded residual data.

17. The device of claim 16, wherein the vector of the current block comprises a motion vector, wherein the first residual block is generated from inter-prediction of the current block, and wherein, in inter-prediction of the current block, the predictive block is in a different picture than the current block.

18. The device of claim 16, wherein the vector of the current block comprises a block vector, wherein the first residual block is generated from intra block copy prediction of the current block, and wherein, in intra block copy prediction of the current block, the predictive block is in the same picture as the current block.

19. The device of claim 16, wherein the device comprises one of:
  a microprocessor;
  an integrated circuit; and
  a wireless communication device.

20. A device for encoding video data, the device comprising:
a video data memory configured to store a predictive block for a current block; and
a video encoder comprising at least one of fixed-function or programmable circuitry, the video encoder being configured to:
  determine a first direction in which residual differential pulse code modulation (DPCM) is to be applied to a first residual block that includes first residual data generated from intra-prediction of a first block;
  determine a first scan order for the first residual block based on the determined first direction in which the residual DPCM is applied;
  determine a second direction in which residual DPCM is to be applied to a second residual block that includes second residual data generated from a difference between the predictive block, referred to by a vector of the current block, and the current block, wherein the current block is a same size as the first block, and wherein the first direction and the second direction are the same;
  determine a second scan order for the second residual block, and no other scan order for the second residual block, based on the determined second direction in which the residual DPCM is applied, wherein the determined second scan order is required to be the same scan order as the determined first scan order based on the first direction in which residual DPCM is applied and the second direction in which residual DPCM is applied being the same;
  entropy encode the second residual data of the second residual block based on the determined second scan order;
  encode information indicating the determined second direction in which residual DPCM is applied; and output the encoded second residual data and the information indicating the determined second direction in which residual DPCM is applied.

21. The device of claim 20, wherein the vector of the current block comprises a motion vector, wherein the second residual block is generated from inter-prediction of the current block, and wherein, in inter-prediction of the current block, the predictive block is in a different picture than the current block.

22. The device of claim 20, wherein the vector of the current block comprises a block vector, wherein the second residual block is generated from intra block copy prediction of the current block, and wherein, in intra block copy prediction of the current block, the predictive block is in the same picture as the current block.

23. The device of claim 20, wherein the video encoder is further configured to determine whether a size of the second residual block is less than or equal to a threshold size, and wherein to determine the second scan order for the second residual block, the video encoder is configured to determine the second scan order for the second residual block based on the determined second direction in which the residual DPCM is applied and whether the size of the second residual block is less than or equal to the threshold.

24. The device of claim 23, wherein the threshold size is 8×8.

25. A device for decoding video data, the device comprising:
   means for decoding information indicating a direction in which residual differential pulse code modulation (DPCM) is applied to a first residual block that includes residual data generated from a difference between a predictive block, referred to by a vector of a current block, and the current block, wherein the information indicating the direction comprises information indicating one of a vertical residual DPCM or a horizontal residual DPCM;
   means for determining a scan order for the first residual block based on the information indicating the direction, wherein the means for determining the scan order for the first residual block comprises means for determining only one:
      a vertical scan based on the horizontal residual DPCM being applied to the first residual block and the size of the first residual block being less than or equal to 8×8, or
      a horizontal scan based on the vertical residual DPCM being applied to the first residual block and the size of the first residual block being less than or equal to 8×8;
   means for entropy decoding the residual data of the first residual block based on the determined scan order; and
   means for reconstructing the current block based on the decoded residual data.

26. A non-transitory computer-readable storage medium having instructions stored thereon that when executed cause a video encoder for a device for encoding video data to:
   determine a direction in which residual differential pulse code modulation (DPCM) is to be applied to a first residual block that includes residual data generated from a difference between a predictive block, referred to by a vector of a current block, and the current block, wherein the determined direction comprises one of a vertical residual DPCM or a horizontal residual DPCM;
   determine a scan order for the first residual block based on the determined direction in which the residual DPCM is applied, wherein to determine the scan order of the first residual block the instructions cause the video encoder to determine only one of:
      a vertical scan based on the determined direction being the horizontal residual DPCM and the size of the first residual block being less than or equal to 8×8, or
      a horizontal scan based on the determined direction being the vertical residual DPCM and the size of the first residual block being less than or equal to 8×8;
   entropy encode the residual data of the first residual block based on the determined scan order;
   encode information indicating the determined direction in which residual DPCM is applied; and
   output the encoded residual data and the information indicating the determined direction in which residual DPCM is applied.

\* \* \* \* \*